(12) United States Patent
Kamiya et al.

(10) Patent No.: US 9,193,604 B2
(45) Date of Patent: *Nov. 24, 2015

(54) FINE PARTICLE COMPOSITE, METHOD FOR PRODUCING THE SAME, CATALYST USED FOR SOLID POLYMER FUEL CELL, AND SOLID POLYMER FUEL CELL

(75) Inventors: Sumio Kamiya, Toyota (JP); Tatsuo Shou, Okazaki (JP); Yukinobu Kato, Toki (JP); Noboru Otake, Toyota (JP); Harumi Kimura, Toyota (JP); Kazumichi Yanagisawa, Kochi (JP); Nan Li, Kochi (JP); Wuxing Zhang, Kochi (JP)

(73) Assignees: Toyota Jidosha Kabushiki Kaisha, Toyota-shi, Aichi (JP); National University Corporation Kochi University, Kochi (JP)

(*) Notice: Subject to any disclaimer, the term of this patent is extended or adjusted under 35 U.S.C. 154(b) by 292 days.

This patent is subject to a terminal disclaimer.

(21) Appl. No.: 12/677,576

(22) PCT Filed: Sep. 12, 2008

(86) PCT No.: PCT/JP2008/066937
§ 371 (c)(1),
(2), (4) Date: Mar. 11, 2010

(87) PCT Pub. No.: WO2009/035163
PCT Pub. Date: Mar. 19, 2009

(65) Prior Publication Data
US 2010/0213420 A1    Aug. 26, 2010

(30) Foreign Application Priority Data
Sep. 14, 2007 (JP) ................................. 2007-239907
Sep. 11, 2008 (JP) ................................. 2008-233905

(51) Int. Cl.
*C01G 39/02* (2006.01)
*C01G 47/00* (2006.01)
(Continued)

(52) U.S. Cl.
CPC ................ *C01G 55/00* (2013.01); *B82Y 30/00* (2013.01); *C01B 17/20* (2013.01); *C01G 39/06* (2013.01);
(Continued)

(58) Field of Classification Search
CPC .............. D06F 7/06; C01G 3/10; B01J 27/02; B01J 23/26; B01J 23/46; B01J 23/462; B01J 23/464
USPC .......................... 252/506; 977/742; 423/447.1
See application file for complete search history.

(56) References Cited

U.S. PATENT DOCUMENTS

| 7,001,581 B2 * | 2/2006 | Kawakami et al. ........ 423/447.3 |
| 2003/0172868 A1 | 9/2003 | Nho et al. |

(Continued)

FOREIGN PATENT DOCUMENTS

| EP | 1 300 364 | 4/2003 |
| JP | 11-288732 | 10/1999 |

(Continued)

OTHER PUBLICATIONS

Xia, Jun-Bao et al., Hydrothermal Synthesis of $MoS_2$/CNT Coaxial Nanotubes, Acta Chimica Sinica, vol. 62, No. 20, (2004), pp. 2109-2112.

(Continued)

*Primary Examiner* — Lorna M Douyon
*Assistant Examiner* — Preeti Kumar
(74) *Attorney, Agent, or Firm* — Finnegan, Henderson, Farabow, Garrett & Dunner, LLP

(57) ABSTRACT

This invention provides a fine particle composite comprising fine particles of a sulfide or sulfide complex comprising at least one element selected from the group consisting of molybdenum (Mo), rhodium (Rh), ruthenium (Ru), and rhenium (Re) and conductive fine particles via a step of preparing a solvent mixture from a compound containing conductive carbon powder, at least one compound containing an element selected from among molybdenum (Mo), rhodium (Rh), ruthenium (R), and rhenium (Re), and sulfur (S) and a step of conducting a hydrothermal or solvothermal reaction at a pressure and temperature that convert the solvent mixture into a supercritical or subcritical water or solvent.

7 Claims, 63 Drawing Sheets

(51) Int. Cl.
  *C01G 55/00* (2006.01)
  *B82Y 30/00* (2011.01)
  *C01B 17/20* (2006.01)
  *C01G 39/06* (2006.01)
  *H01M 4/90* (2006.01)
  *H01M 4/92* (2006.01)
  *H01M 8/10* (2006.01)

(52) U.S. Cl.
  CPC ............ *C01G 47/00* (2013.01); *H01M 4/90* (2013.01); *H01M 4/9083* (2013.01); *H01M 4/923* (2013.01); *H01M 4/926* (2013.01); *C01P 2002/72* (2013.01); *C01P 2002/82* (2013.01); *C01P 2004/03* (2013.01); *C01P 2004/04* (2013.01); *C01P 2004/62* (2013.01); *C01P 2004/64* (2013.01); *C01P 2006/40* (2013.01); *H01M 2008/1095* (2013.01); *Y02E 60/50* (2013.01)

(56) References Cited

U.S. PATENT DOCUMENTS

| | | |
|---|---|---|
| 2004/0236157 A1 | 11/2004 | Heilgendorff et al. |
| 2004/0262577 A1 | 12/2004 | Urabe et al. |

FOREIGN PATENT DOCUMENTS

| | | |
|---|---|---|
| JP | 2000-143244 | 5/2000 |
| JP | 2001-502467 | 2/2001 |
| JP | 2004-520260 | 7/2004 |
| JP | 2004-532734 | 10/2004 |
| JP | 2005-36214 | 2/2005 |
| JP | 2005-264108 | 9/2005 |
| JP | 2006-252797 | 9/2006 |
| JP | 2007-42519 | 2/2007 |
| JP | 2007-084390 | 4/2007 |
| WO | WO 98/18171 | 4/1998 |

OTHER PUBLICATIONS

Song, X.C. et al., "Hydrothermal synthesis and characterization of CNT@$MoS_2$ nanotubes," Science Direct, Materials Letters, vol. 60, (2006), pp. 2346-2348.

Zhan, J.H. et al., "Solvothermal Synthesis of Nanocrystalline $MoS_2$ from $MoO_3$ and Elemental Sulfur," Journal of Solid State Chemistry, vol. 141, (1998), pp. 270-273.

R.W. Reeve et al., "Methanol Tolerant Oxygen Reduction Catalyst Based on Transition Metal Sulfides," J. Electrochem. Soc., vol. 145, No. 10, pp. 3463-3471 (Oct. 1998).

R. Reeve et al., "Methanol-tolerant Oxygen Reduction Catalysts Based on Transition Metal Sulfides and their Application to the Study of Methanol Permeation," Electrochimica Acta, vol. 45, pp. 4237-4250 (2000).

V. Trapp et al., "New Catalysts for Oxygen Reduction Based on Transition-metal Sulfides," J. Chem. Soc., Faraday Trans., vol. 92, No. 21, pp. 4311-4319 (1996).

O. Solorza-Feria et al., "Novel Low-Temperature Synthesis of Semi-conducting Transition Metal Chalcogenide Electrocatalyst for Multielectron Charge Transfer: Molecular Oxygen Reduction," Electrochimica Acta, vol. 39, No. 11/12, pp. 1647-1653 (1994).

Extended European Search Report for EP Appl. No. 08830969.5 dated Jun. 29, 2012.

European Search Report for EP Appl. No. 08830969.5 dated Jul. 13, 2012.

Wang, Q. et al., "Facilitated Lithium Storage in $MoS_2$ Overlayers Supported on Coaxial Carbon Nanotubes," J. Phys. Chem. C, 111, (2007), pp. 1675-1682.

Ma, L. et al., "Carbon nanotubes coated with tubular $MoS_2$ layers prepared by hydrothermal reaction," Nanotechnology 17, (2006), pp. 571-574.

Official Action in Japanese Patent Appln. No. 2009-27834, issued Feb. 19, 2013.

\* cited by examiner

A

B

A

B

A

B

A

B

A

B

A

B

A

B

A

B

C

A

B

A

B

C

D

A a

B b

A

B

A

B

A

B

C

D

A

B

A

B

C

D

FINE PARTICLE COMPOSITE, METHOD FOR PRODUCING THE SAME, CATALYST USED FOR SOLID POLYMER FUEL CELL, AND SOLID POLYMER FUEL CELL

CROSS-REFERENCE TO RELATED APPLICATIONS

This application is a national phase application of International Application No. PCT/JP2008/066937, filed Sep. 12, 2008, and claims the priority of Japanese Application Nos. 2007-239907, filed Sep. 14, 2007, and 2008-233905, filed Sep. 11, 2008, the contents of all of which are incorporated herein by reference.

TECHNICAL FIELD

The present invention relates to a fine particle composite comprising fine particles of a sulfide or sulfide complex comprising at least one element selected from the group consisting of molybdenum (Mo), rhodium (Rh), ruthenium (Ru), and rhenium (Re), and a method for producing the same. Also, the present invention relates to a catalyst used for a solid polymer fuel cell and a solid polymer fuel cell comprising the fine particle composite.

BACKGROUND ART

Hydrothermal and solvothermal reactions have drawn attention as means for synthesizing compounds. For example, JP Patent Publication (kokai) No. H11-288732 A (1999) discloses a method for preparing zinc sulfide particles having multiply twinned structures and an average particle diameter of 5 nm to 20 μm via a hydrothermal reaction of a sulfur ion and a zinc ion using water as a reaction solvent at 150° C. to 370° C. during the process of particle growth.

Various chalcogenide compounds have drawn attention as alternatives to existing expensive platinum catalysts. Catalysts used for polymer electrolyte fuel cells are mainly platinum and platinum-alloy-based catalysts. Specifically, catalysts in which a platinum-containing noble metal is supported by carbon black have been used. In terms of practical applications of polymer electrolyte fuel cells, one problem relates to the cost of materials. A means to solve such problem involves the reduction of platinum content.

Recently, low-cost fuel cell catalysts have been developed via a reaction that produces water as a result of four-electron reduction of oxygen, which results in elimination of the need for expensive platinum catalysts. Electrochimica Acta, vol. 39, No. 11/12, pp. 1647-1653, 1994 discloses that a catalyst comprising a chalcogen element is excellent in terms of four-electron reduction performance and suggests that such catalyst be applied to fuel cells. Specifically, Electrochimica Acta, vol. 39, No. 11/12, pp. 1647-1653, 1994 discloses a Mo—Ru—Se ternary electrode catalyst and a method for synthesizing the same.

Also, JP Patent Publication (kohyo) No. 2001-502467 A discloses, as a platinum (Pt) catalyst substitute, an electrode catalyst comprising at least one transition metal and a chalcogen. An example of a transition metal is Ru and an example of a chalcogen is S or Se. It is also disclosed that, in such case, the Ru:Se molar ratio is from 0.5:1 to 2:1 and the stoichiometric number "n" of (Ru)nSe is 1.5 to 2.

Further, JP Patent Publication (kohyo) No. 2004-532734 A discloses, as a Pt catalyst substitute, a fuel cell catalyst material comprising a transition metal that is either Fe or Ru, an organic transition metal complex containing nitrogen, and a chalcogen component such as S.

Further, J. Chem. Soc., Faraday Trans., 1996, 92 (21), 4311-4319 discloses Ru—S, Mo—S, and Mo—Ru—S binary and ternary electrode catalysts and methods for synthesizing the same.

Further, Electrochimica Acta, vol. 45, pp. 4237-4250, 2000 discloses Ru—Mo—S and Ru—Mo—Se ternary chalcogenide electrode catalysts.

DISCLOSURE OF THE INVENTION

The present invention is intended to provide a fine particle composite comprising fine particles of a sulfide or sulfide complex comprising a given element and a method for producing the same. The present invention is also intended to apply such fine particle composite to a catalyst used for a fuel cell, and the present invention thus relates to a catalyst used for a solid polymer fuel cell and a solid polymer fuel cell comprising such fine particle composite.

The present inventors discovered that the above object could be attained via a hydrothermal or solvothermal reaction and arrived at the present invention.

Specifically, the first aspect of the present invention concerns a fine particle composite comprising fine particles of a sulfide or sulfide complex comprising at least one element selected from the group consisting of molybdenum (Mo), rhodium (Rh), ruthenium (Ru), and rhenium (Re) and conductive fine particles. The fine particle composite of the present invention at least comprises the above components. Fine particles of a sulfide or sulfide complex comprising at least one element selected from the group consisting of molybdenum (Mo), rhodium (Rh), ruthenium (Ru), and rhenium (Re) have catalyst functions in oxygen reduction reactions and conductive fine particles function as catalyst carriers. Accordingly, the fine particle composite of the present invention have carriers and, thus, such fine particle composite are not in particular need of other carriers.

Regarding the fine particle composite of the present invention, the average particle diameter is preferably 1 nm to 1 μm.

In the fine particle composite of the present invention, a sulfide or sulfide complex comprising at least one element selected from the group consisting of molybdenum (Mo), rhodium (Rh), ruthenium (Ru), and rhenium (Re) can be configured in various ways. Specifically, such sulfide or sulfide complex can be in the form of single-crystal fine powder.

The single-crystal fine powder of the present invention can be configured in various ways. For example, that of an approximately spherical configuration can be obtained.

Preferable examples of the aforementioned sulfide as a component of the fine particle composite of the present invention include binary compounds selected from among molybdenum sulfide ($Mo_2S_2$, $MoS_2$, $Mo_2S_3$, $MoS_3$, or $MoS_4$), rhodium sulfide ($Rh_{17}S_{15}$, $Rh_9S_8$, $Rh_3S_4$, $Rh_2S_3$, or $Rh_2S_5$), ruthenium sulfide ($RuS_2$), and rhenium sulfide ($ReS_2$ or $Re_2S_7$).

An example of a preferable sulfide complex is a ternary compound represented by Rh—X—S or Ru—X—S, wherein X is preferably at least one element selected from among molybdenum (Mo), palladium, (Pd), selenium (Se), silicon (Si), tantalum (Ta), tellurium (Te), thorium (Th), vanadium (V), zinc (Zn), rhodium (Rh), ruthenium (Ru), antimony (Sb), and tungsten (W). Rh or Ru functions as a catalyst and X functions as a promoter. Among them, particularly preferable examples include Rh—Mo—S and Ru—Mo—S.

Preferable examples of the aforementioned fine particle as a component of the fine particle composite of the present invention include carbon black and/or carbon nanotube.

The second aspect of the present invention concerns a method for producing a fine particle composite comprising fine particles of a sulfide or sulfide complex comprising at least one element selected from the group consisting of molybdenum (Mo), rhodium (Rh), ruthenium (Ru), and rhenium (Re) and conductive fine particles. The method comprises steps of: preparing a solvent mixture from at least one compound comprising conductive carbon powder, an element selected from among molybdenum (Mo), rhodium (Rh), ruthenium (Ru), and rhenium (Re), and a sulfur (S)-containing compound; and performing a hydrothermal or solvothermal reaction at a pressure and temperature that converts the solvent mixture into a supercritical or subcritical water or solvent.

Solvents used for a solvothermal reaction are not limited, and examples of such a solvent include xylene, acetone, and chloroform.

In the present invention, the hydrothermal or solvothermal reaction is preferably carried out at 200° C. to 600° C.

Also, thermal treatment in an inert gas atmosphere at 300° C. to 800° C. following the step of a hydrothermal or solvothermal reaction can improve crystallinity, thereby dispersing residues of starting compounds, such as carbonyl groups.

In the present invention, preferable examples of the conductive carbon powder include carbon black and/or carbon nanotube.

The fine particle composite of the present invention can be produced by carrying out the reaction in situ. Compared with conventional methods for producing catalysts used for fuel cells involving combinations of several reactions, the fact that the fine particle composite can be produced by performing all reactions in situ is a remarkable advantage of the present invention.

The third aspect of the present invention concerns a catalyst used for a solid polymer fuel cell comprising the fine particle composite. The catalyst of the present invention can serve as a substitute for an expensive platinum catalyst.

The fourth aspect of the present invention concerns a solid polymer fuel cell comprising the above fine particle composite as a catalyst.

Use of the fine particle composite of the present invention comprising fine particles of a sulfide or sulfide complex comprising at least one element selected from the group consisting of molybdenum (Mo), rhodium (Rh), ruthenium (Ru), and rhenium (Re) and conductive fine particles can be realized in the form of various types of reaction catalysts by utilizing catalytic performance such that it does not require the use of a carrier. For example, such fine particle composite can be utilized for a catalyst for a fuel cell while serving as a cost-effective alternative to an existing platinum catalyst. Further, adequate selection of a dopant element with which the fine particle composite is to be doped leads to improvement in catalytic properties.

By performing all the reaction processes for producing the fine particle composite in situ, a catalyst used for a fuel cell, which had heretofore been produced in complicated steps, can be easily manufactured.

BEST MODES FOR CARRYING OUT THE INVENTION

Objectives of the present examples are to synthesize a fine particle composite comprising fine particles of $MoS_2$, $RuS_2$, $Rh_2S_3$, or $ReS_2$ and conductive fine particles via a hydrothermal or solvothermal reaction, to explore the possibility of a fine particle composite comprising fine particles of a binary or ternary sulfide solid solution and conductive fine particles, and to establish applications of such fine particle composite comprising fine particles of a sulfide or sulfide complex and conductive fine particles as a catalyst used for a fuel cell.

Figure 1:
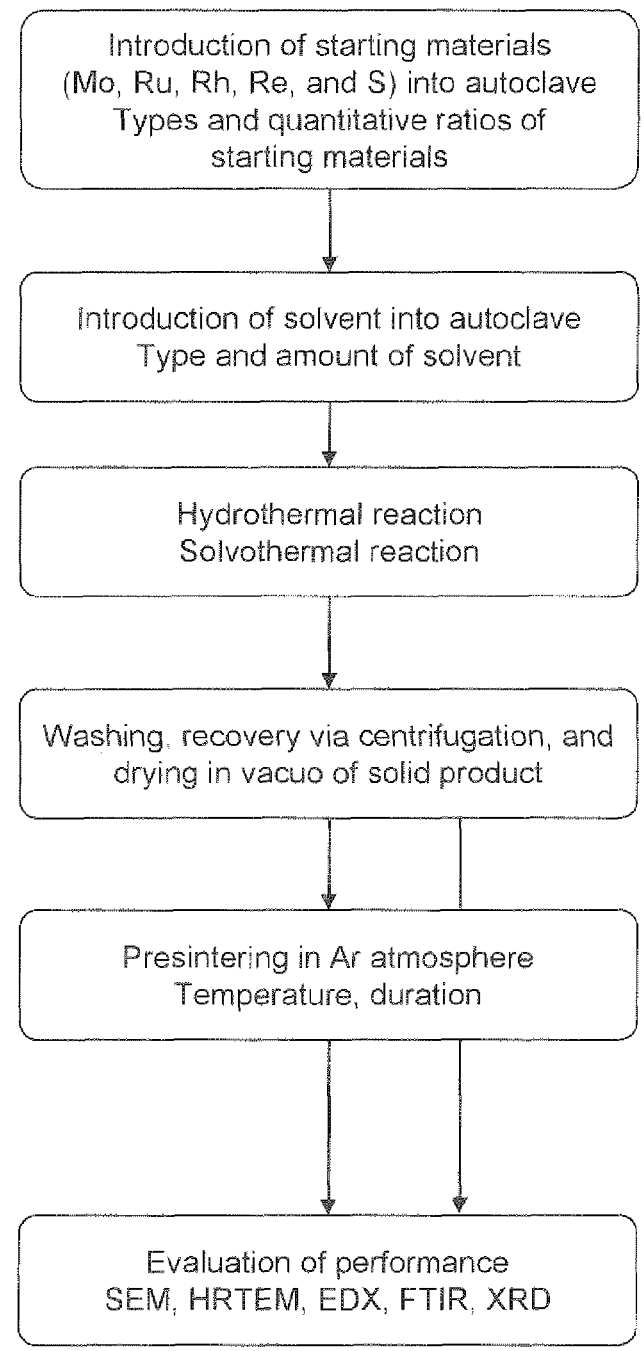
FIG. 1 is a flow chart detailing the method of synthesis via a hydrothermal or solvothermal reaction of the present invention.

FIG. 1 shows a flow chart detailing the method of synthesis via a hydrothermal or solvothermal reaction of the present invention. A Teflon-lined autoclave was used for a low-temperature reaction, and a Hastelloy-C-lined autoclave was used for a high-temperature reaction. The reaction was carried out in situ. Specific conditions for synthesis are described below.

The conditions are as shown in FIG. 1.

(1) Starting materials (Mo, Ru, Rh, Re, and S) are introduced into an autoclave. The types and the quantitative ratio of starting materials are determined.

(2) A solvent is introduced into an autoclave. The type and the amount of the solvent are determined.

(3) A hydrothermal or solvothermal reaction is carried out.

(4) A solid product is washed, recovered with the use of a centrifuger, and then dried in vacuo.

(5) Precalcination is carried out in an inert gas atmosphere, such as Ar. The temperature and the duration are determined.

(6) Properties are evaluated by means of SEM, HRTEM, EDX, FTIR, XRT, or other means.

EXAMPLE 1

Synthesis of $MoS_2$ $Mo(CO)_6$, $MoCl_5$, $(NH_4)_6Mo_7O_{24}\cdot 4H_2O$, and $(NH_4)_3[PO_4Mo_{12}O]\cdot 3H_2O$ were used as starting materials for Mo, S (solid sulfur) and thiourea ($(NH_2)_2CS$) were used as starting materials for S, and xylene or distilled water was used as a solvent. A solvothermal or hydrothermal reaction was carried out at 220° C. or 350° C. for 10 hours. Thereafter, precalcination was carried out in an Ar atmosphere at 350° C. to 750° C. for 5 hours.

1.1: Synthesis of $MoS_2$ Via Solvothermal Reaction

When $Mo(CO)_6$ and S were used as starting materials for the solvothermal reaction, veil-dispersed $MoS_2$ powder was obtained. $MoS_2$ powder that had been synthesized at a low temperature of 220° C. for 10 hours had low crystallinity although crystallinity was improved via precalcination in an argon atmosphere at 350° C. By synthesizing the powder at a high temperature of 350° C. for 10 hours, the crystallinity of the resulting powder was improved, compared with the powder synthesized at a low temperature.

1.1.1: Influence Imposed by Starting Materials for Mo

A synthesis experiment was performed using $Mo(CO)_6$ or $MoCl_5$ as a starting material for Mo at 220° C. for 10 hours. When using $MoCl_5$ as a starting material, the resulting $MoS_2$ powder had somewhat higher crystallinity, and particles were more firmly aggregated. Thus, $Mo(CO)_6$ was employed as a starting material for Mo.

Figure 2:
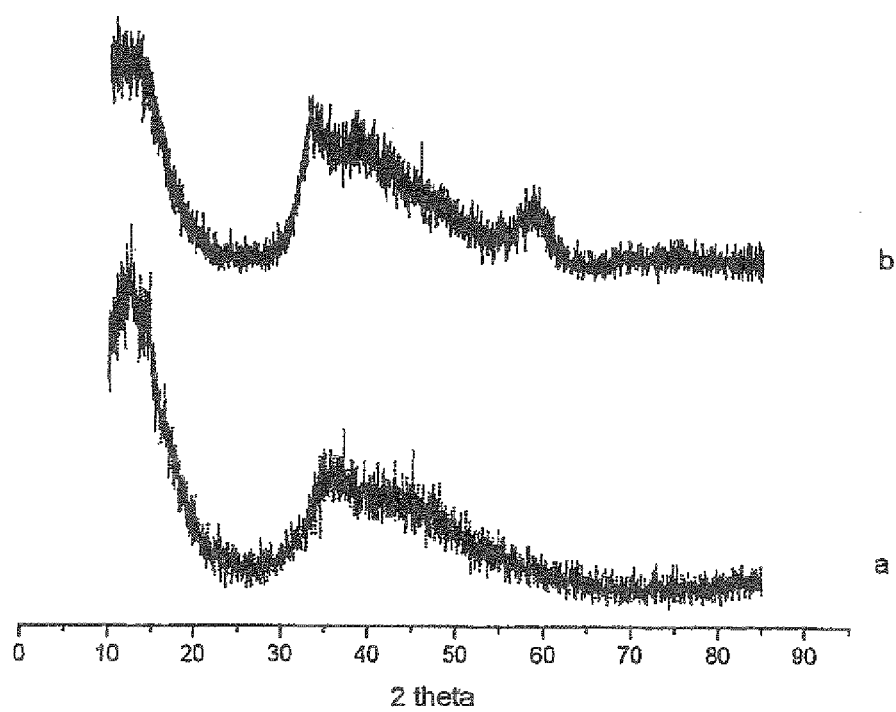
FIG. 2 shows an XRD pattern of $MoS_2$ synthesized via a solvothermal reaction.

FIG. 2 shows an XRD pattern of $MoS_2$ synthesized via a solvothermal reaction, with the solvent being xylene, the temperature being 220° C., and the duration being 10 hours. In the figure, "a" represents $MoCl_5+S$ and "b" represents $Mo(CO)_6+S$.

Figure 3:
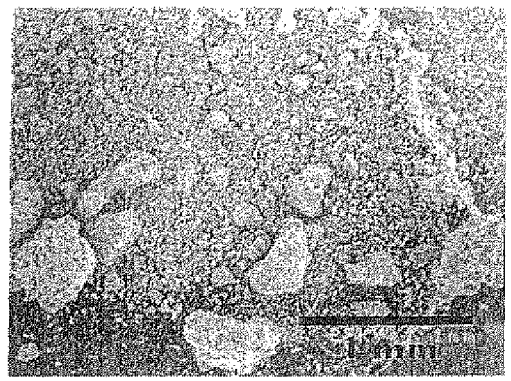
FIG. 3 shows an SEM photograph of $MoS_2$ powder synthesized from $MoCl_5$ precalcined at 400° C. for 5 hours.
Figure 3:
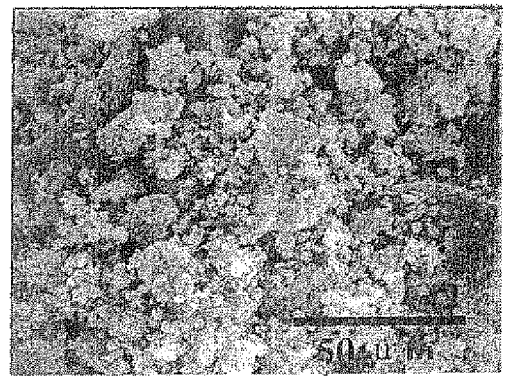

FIG. 3 shows an SEM photograph of $MoS_2$ powder synthesized from $MoCl_5$ precalcined at 400° C. for 5 hours.

1.1.2: Influence Imposed by Starting Materials for S

A synthesis experiment was performed using S or thiourea as a starting material for sulfur at 220° C. for 10 hours. The resulting $MoS_2$ powder had somewhat higher crystallinity when synthesized from S. In contrast, the resultant became firmly aggregated when thiourea was used as a starting material. Thus, S was employed as a sulfur source.

Figure 4:
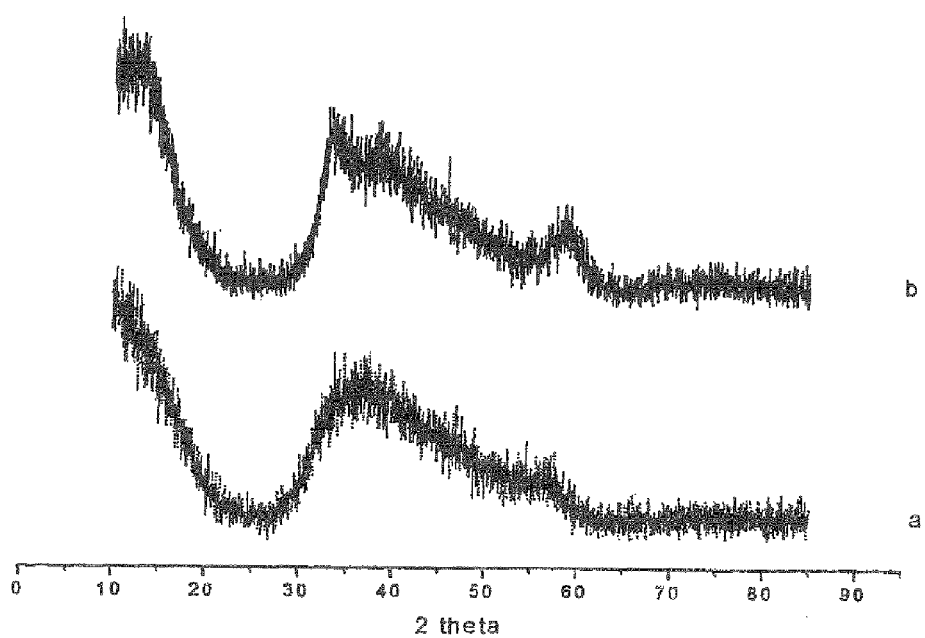
FIG. 4 shows an XRD pattern of $MoS_2$ synthesized via a solvothermal reaction.

FIG. 4 shows an XRD pattern of $MoS_2$ synthesized via a solvothermal reaction, with the solvent being xylene, the temperature being 220° C., and the duration being 10 hours. In the figure, "a" represents $Mo(CO)_6$+thiourea, and "b" represents $Mo(CO)_6+S$.

Figure 5:
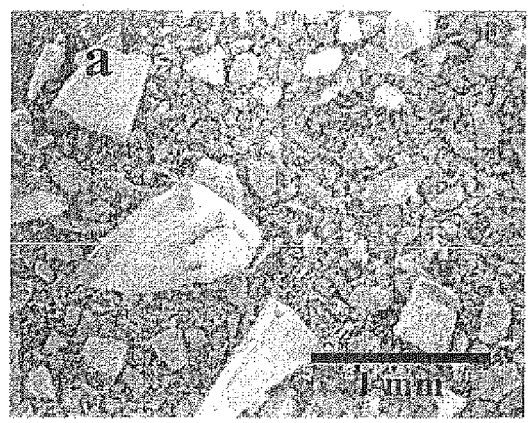
FIG. 5 shows an SEM photograph of $MoS_2$ powder synthesized from thiourea precalcined at 400° C. for 5 hours.
Figure 5:
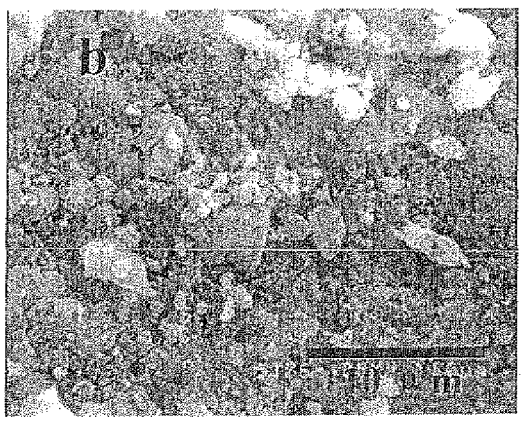

FIG. 5 shows an SEM photograph of $MoS_2$ powder synthesized from thiourea precalcined at 400° C. for 5 hours.

Figure 6:
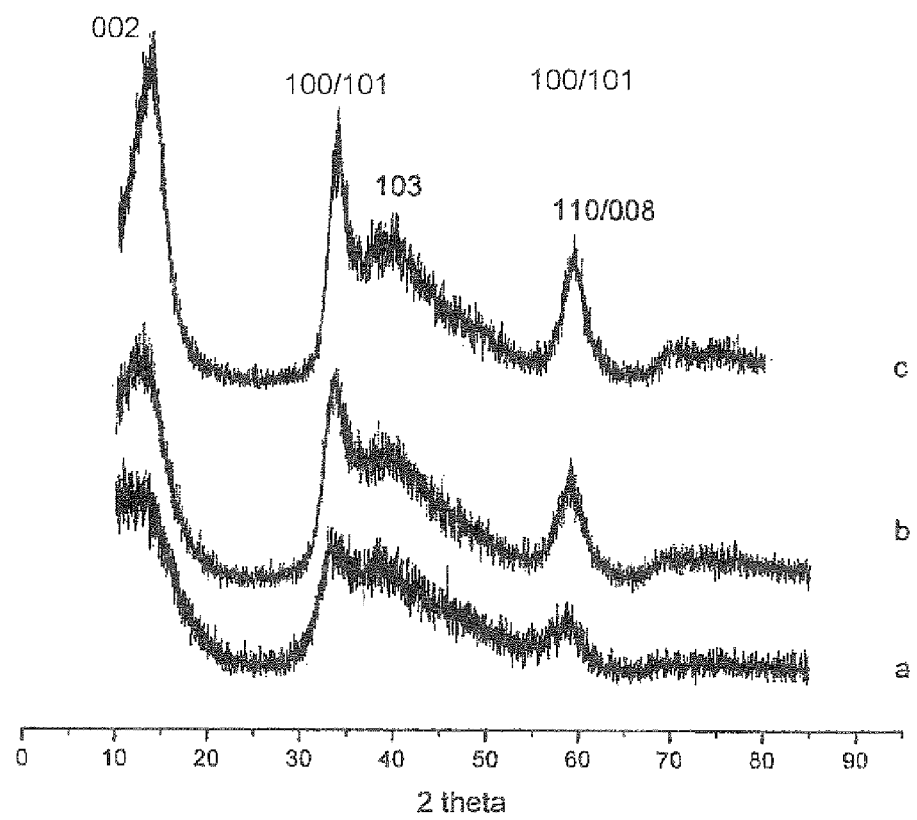
FIG. 6 shows XRD patterns of $MoS_2$ synthesized via a solvothermal reaction (a) and the resultant of precalcination thereof (b, c).

1.1.3: Effects of Precalcination $MoS_2$ synthesized from $Mo(CO)_6$ and S via a solvothermal reaction at 220° C. for 10 hours was precalcined in an Ar stream. FIG. 6 shows XRD patterns of $MoS_2$ synthesized via a solvothermal reaction (a) and resultant of precalcination thereof (b, c); wherein "b" represents 350° C. for 2 hours and "c" represents 600° C. for 2 hours.

As shown in FIG. 6, crystallinity was increased via precalcination at 350° C., and crystallinity attained via precalcination at 600° C. was not very different from that attained at 350° C. Thus, it was determined that precalcination would be carried out at 400° C. or higher for 5 hours in the following experiments.

1.1.4: Influence Imposed by S:Mo Ratio

Figure 7:
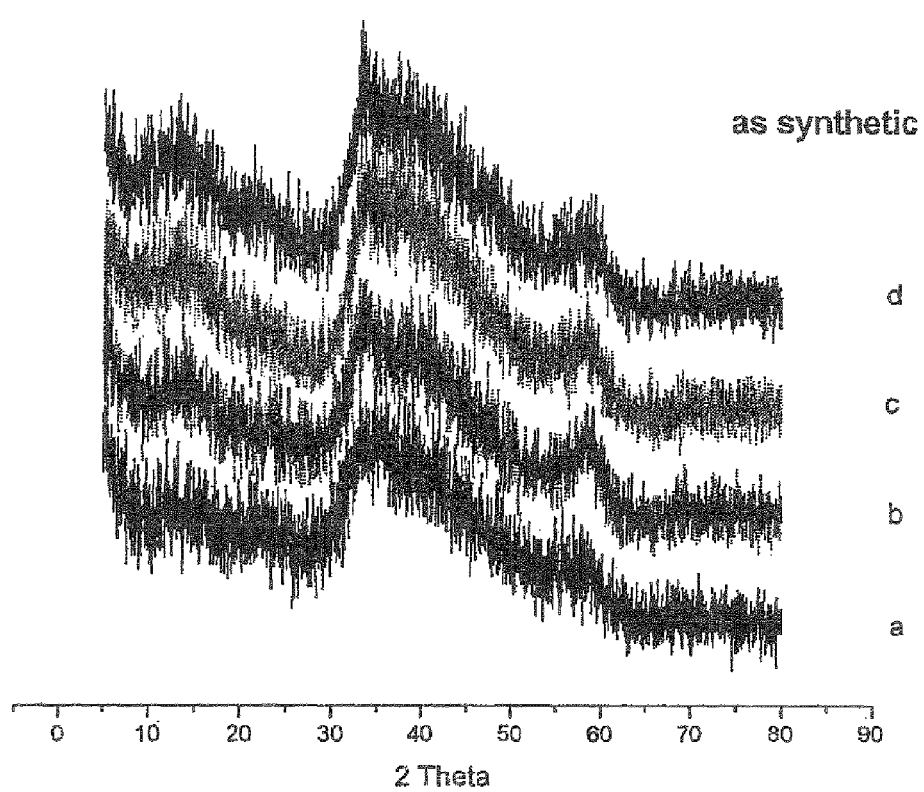
FIG. 7 shows XRD patterns of $MoS_2$ products synthesized from $Mo(CO)_6$ and S while varying S:Mo ratios via a solvothermal reaction at 220° C. for 10 hours.
Figure 8:
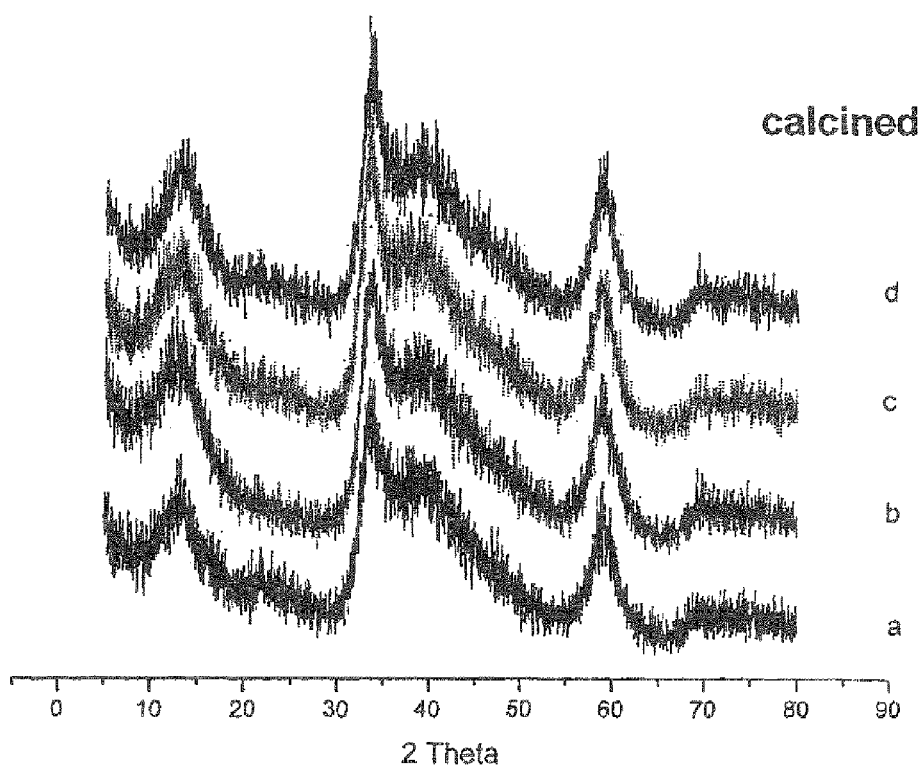
FIG. 8 shows XRD patterns of the resultant of precalcination of $MoS_2$ at 400° C. for 5 hours. Such resultants were synthesized from $Mo(CO)_6$ and S via a solvothermal reaction at 220° C. for 10 hours while varying S:Mo ratios.

When synthesizing $MoS_2$ from $Mo(CO)_6$ and S via a solvothermal reaction at 220° C. for 10 hours, the S:Mo ratios of the starting materials were varied. FIG. 7 shows XRD patterns of $MoS_2$ products synthesized from $Mo(CO)_6$ and S via a solvothermal reaction at 220° C. for 10 hours while varying S:Mo ratios. Also, FIG. 8 shows XRD patterns of a resultant of precalcination of $MoS_2$ at 400° C. for 5 hours synthesized from $Mo(CO)_6$ and S via a solvothermal reaction at 220° C. for 10 hours while varying S:Mo ratios. In these figures, "a" represents an S:Mo ratio of 1.6:1, "b" represents a ratio of 2.0:1, "c" represents a ratio of 2.4:1, and "d" represents a ratio of 3.0:1.

As shown in FIG. 7 and in FIG. 8, the resulting product had a monolayer structure of $MoS_1$, even when the S:Mo ratio was varied from 1.6:1 to 3.0:1. When the S:Mo ratio was 2.0:1 or higher, the crystallinity of $MoS_2$ was somewhat increased. No difference was observed in the crystallinity of products precalcined at 400° C. for 5 hours in an argon stream.

Figure 9:
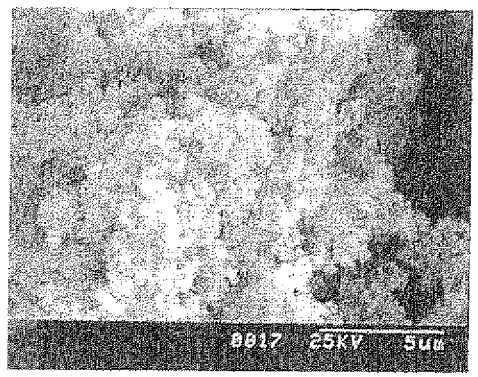
FIG. 9A shows a scanning electron micrograph of $MoS_2$ resulting from a solvothermal reaction.
FIG. 9B shows that of a resultant of precalcination thereof at 400° C. for 5 hours.
Figure 9:
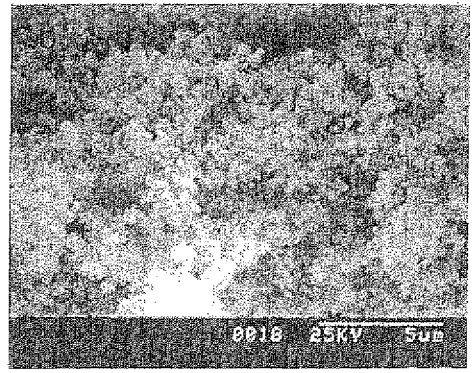
Figure 10:
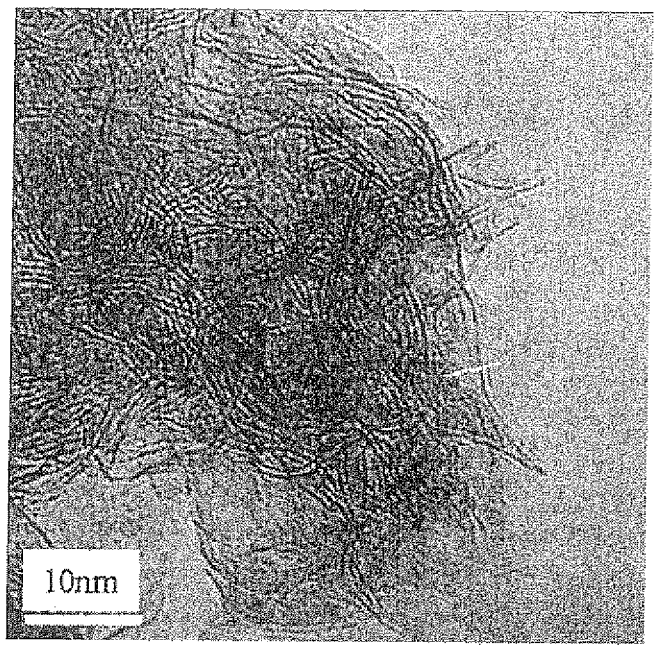
FIG. 10 shows a transmission electron micrograph of a resultant of precalcination, at 400° C. for 5 hours, of $MoS_2$ resulting from a solvothermal reaction.

1.1.5: Microscopic Observation of $MoS_2$ $MoS_2$ synthesized from $Mo(CO)_6$ and S via a solvothermal reaction at 220° C. for 10 hours at an S:Mo ratio of 2.4:1 and a resultant of precalcination thereof at 400° C. for 5 hours were observed under an electron microscope. FIG. 9A shows a scanning electron micrograph of $MoS_2$ resulting from a solvothermal reaction, and FIG. 9B shows that of a resultant of precalcination thereof at 400° C. for 5 hours. FIG. 10 shows a transmission electron micrograph of a resultant of precalcination, at 400° C. for 5 hours, of $MoS_2$ resulting from a solvothermal reaction. The resulting $MoS_2$ was found to be composed of well-dispersed fine particles of about 100 nm, which was significantly different from $MoS_2$ synthesized from other Mo starting materials shown in FIGS. 3A, 3B, 5A, and 5B. In particular, enhanced aggregation was not observed as a result of precalcination.

As a result of transmission electron microscopic observation, the product was found to have a fine structure of multiple layers of fibers. The XRD pattern of the resultant may be different from that described in the JCPDS card in terms of diffraction intensities, because of such structure.

1.1.6: Synthesis at High Temperature

Figure 11:
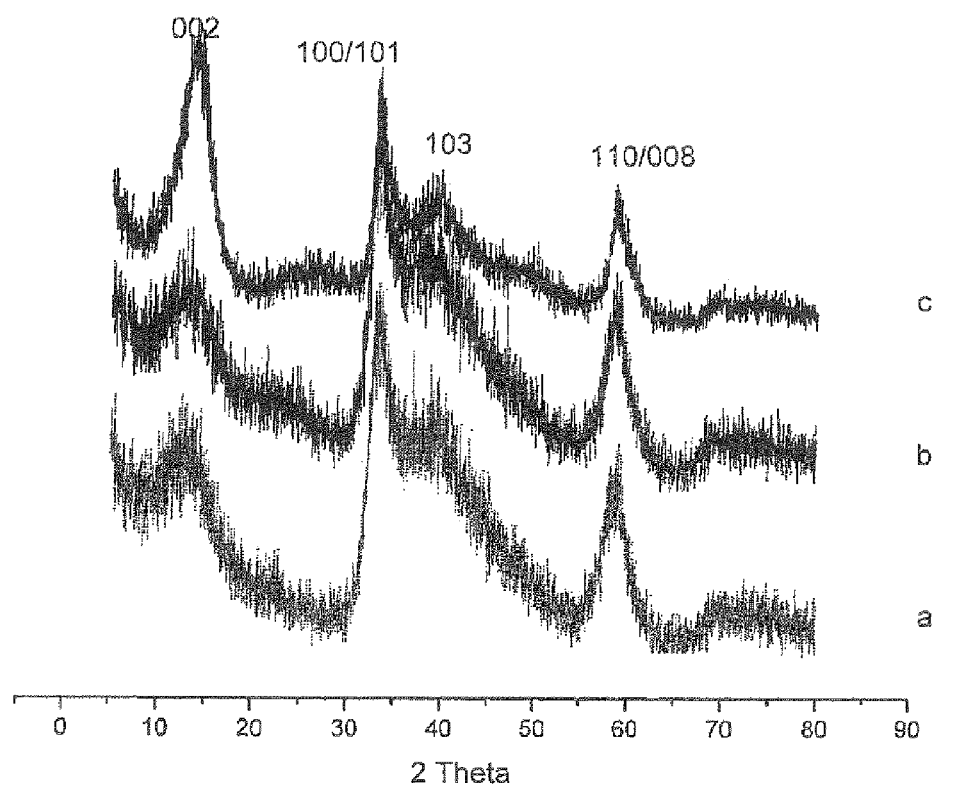
FIG. 11 shows an XRD pattern of $MoS_2$ resulting from a solvothermal reaction.

Synthesis of $MoS_2$ from $Mo(CO)_6$ and S via a solvothermal reaction at a higher temperature of 350° C. for 10 hours was attempted while varying the S:Mo ratio. FIG. 11 shows an XRD pattern of $MoS_2$ resulting from a solvothermal reaction.

Figure 12:
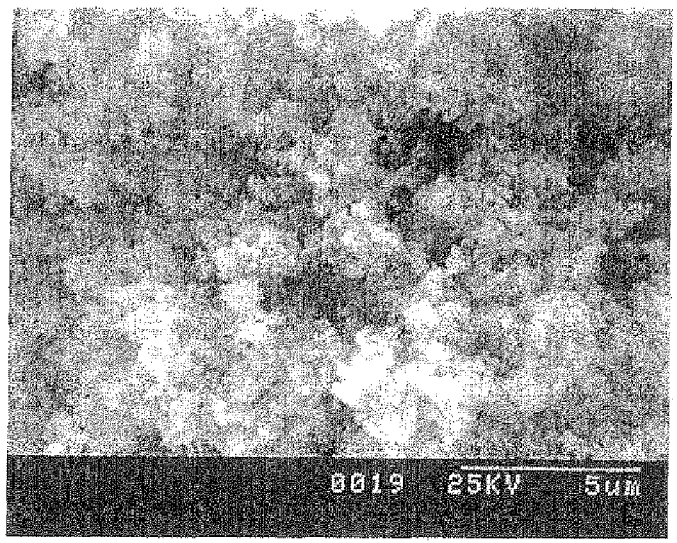
FIGS. 12A and 12B each show an electron micrograph of $MoS_2$ resulting from a solvothermal reaction.
Figure 12:
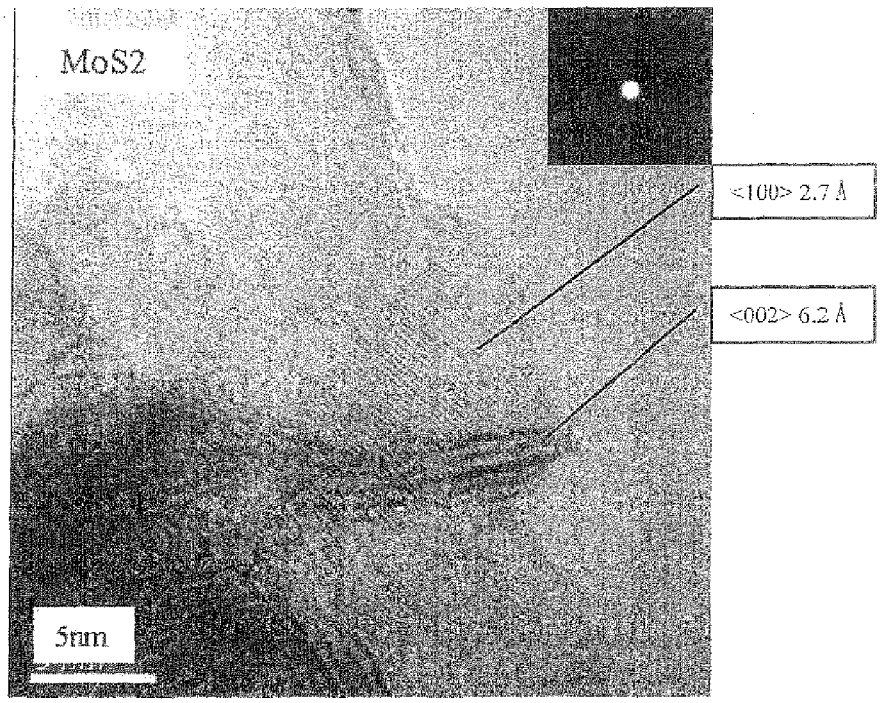
Figure 13:
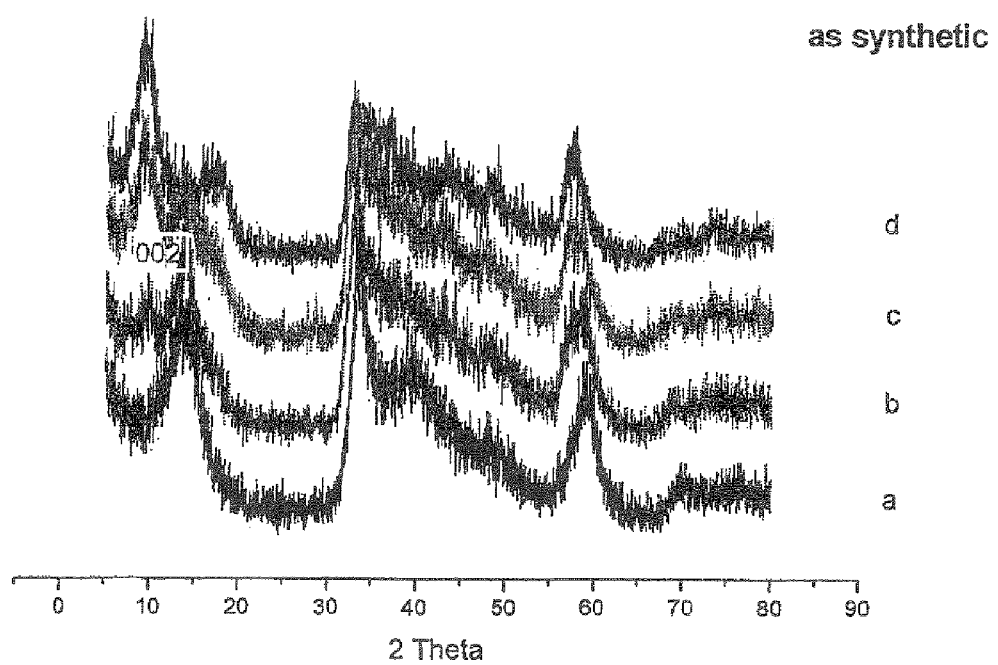
FIG. 13 shows an XRD pattern of $MoS_2$ hydrothermally synthesized at 220° C. for 10 hours with the addition of ammonia.

Also, FIGS. 12A and 12B each show an electron micrograph of $MoS_2$ resulting from a solvothermal reaction.

By raising the reaction temperature, crystallinity of the resulting $MoS_2$ was improved to a level equivalent to that attained via precalcination. When the S:Mo ratio was particularly high, the diffraction intensity of (002) was increased.

As a result of scanning electron microscopic observation, the configuration of the product was found to be the same as the configuration resulting from a low-temperature reaction, and it was found to be composed of fine particles. As a result of transmission electron microscopic observation, two components, i.e., a fibrous layer having a strong contrast and a lattice layer having relatively high crystallinity, were observed. The lattice intervals were found to be 6.2 Å and 2.7 Å, which were considered to correspond to <002> and <100> of $MoS_2$.

It was thus demonstrated that $MoS_2$ with high crystallinity and excellent dispersibility could be synthesized via a solvothermal reaction using $Mo(CO)_6$ and S as starting materials at an S:Mo ratio of 3:1 at 350° C. for 10 hours.

1.2: Synthesis of MoS2 Via Hydrothermal Reaction

Synthesis of MoS2 was attempted via a hydrothermal reaction using $MoCl_5$, $(NH_4)_6Mo_7O_{24} \cdot 4H_2O$, and $(NH_4)_3[PO_4Mo_{12}O] \cdot 3H_2O$ as starting materials for Mo and thiourea $((NH_2)_2CS)$ as a starting material for S. As a result, $MoS_2$ having higher crystallinity than the crystallinity attained via a solvothermal reaction was obtained. When sodium hydroxide was added to $MoCl_5$, $MoS_2$ composed of fine particles having relatively high dispersibility was obtained with the use of $(NH_4)_6Mo_7O_{24} \cdot 4H_2O$ or $(NH_4)_3[PO_4Mo_{12}O] \cdot 3H_2O$ as a starting material.

1.2.1: Reaction Between $MoCl_5$ and Thiourea with the Addition of Ammonia

Figure 14:
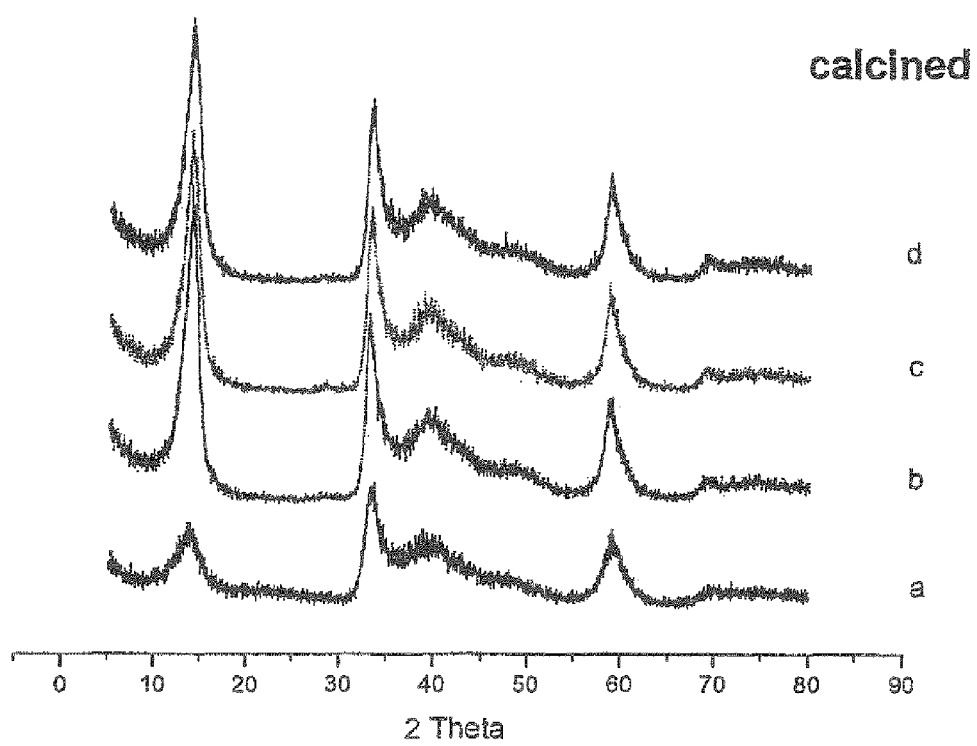
FIG. 14 shows an XRD pattern of a resultant of precalcination, in an argon stream at 400° C. for 5 hours, of $MoS_2$ hydrothermally synthesized with the addition of ammonia.
Figure 15:
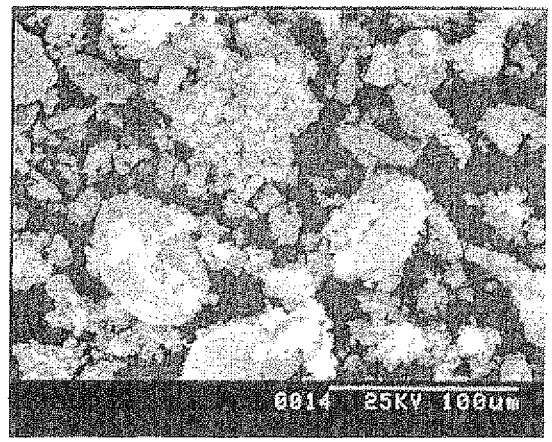
FIGS. 15A and 15B each show a scanning electron micrograph of $MoS_2$ (an S:Mo ratio of 2.2:1) hydrothermally synthesized at 220° C. for 10 hours with the addition of ammonia.
Figure 15:
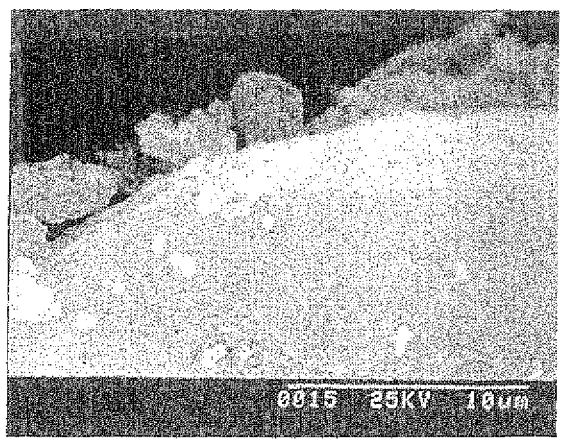

Synthesis of $MoS_2$ was attempted using $MoCl_5$ and thiourea as starting materials while varying the quantitative ratio thereof and varying the amount of ammonia to be added at 220° C. for 10 hours. 13 shows an XRD pattern of $MoS_2$ hydrothermally synthesized at 220° C. for 10 hours with the addition of ammonia. FIG. 14 shows an XRD pattern of a resultant of precalcination, in an argon stream at 400° C. for 5 hours, of $MoS_2$ hydrothermally synthesized with the addition of ammonia. In these figures, "a" represents an S:Mo ratio of 2.2:1 without the addition of ammonia, "b" represents an S:Mo ratio of 2.2:1 in the presence of 50% of ammonia by volume, "c" represents an S:Mo ratio of 3.0:1 in the presence of 50% of ammonia by volume, and "d" represents an S:Mo ratio of 4.0:1 in the presence of 50% of ammonia by volume. Further, FIGS. 15A and 15B each show a scanning electron micrograph of $MoS_2$ (an S:Mo ratio of 2.2:1) hydrothermally synthesized at 220° C. for 10 hours with the addition of ammonia.

When the S:Mo ratio was 30:1, a product exhibiting a deviated diffraction line (002) was obtained, regardless of the presence or absence of ammonia. When this product was precalcined at 400° C., the same diffraction pattern as that of conventional MoS7 was obtained. When the S:Mo ratio was 30:1, some sorts of substances may have been introduced into sites between layers. Precalcination resulted in improved crystallinity. In general, the product was firmly aggregated.

Figure 16:
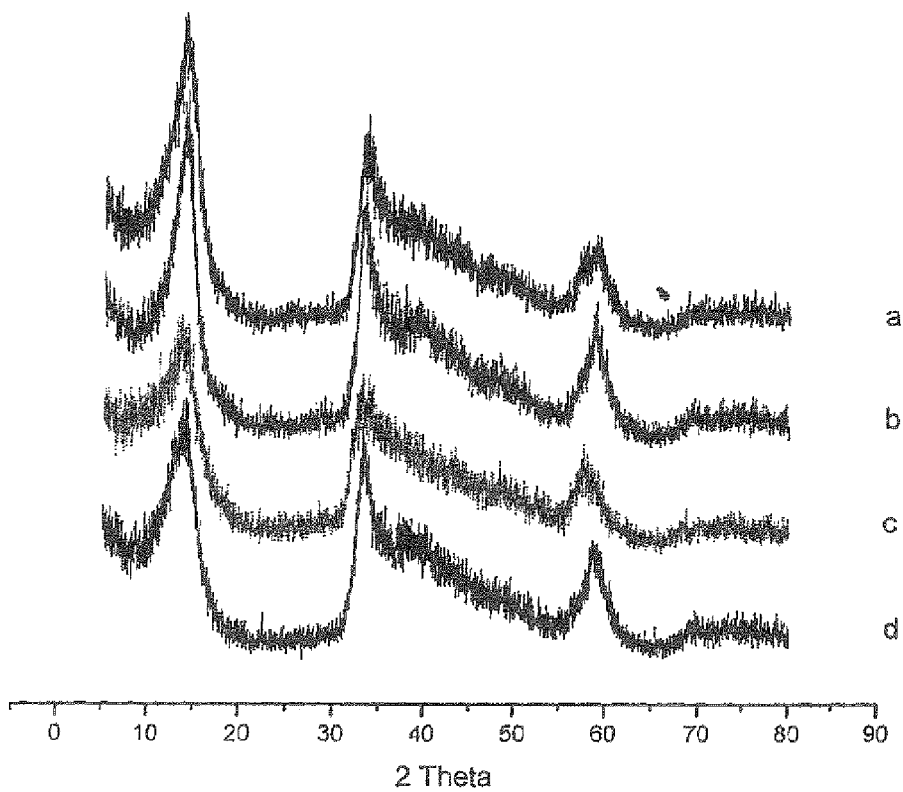
FIG. 16 shows an XRD pattern of $MoS_2$ hydrothermally synthesized at 220° C. for 10 hours with the addition of sodium hydroxide at an S:Mo ratio of 2.2:1 and that of $MoS_2$ precalcined at 400° C. for 5 hours in an argon stream.
Figure 17:
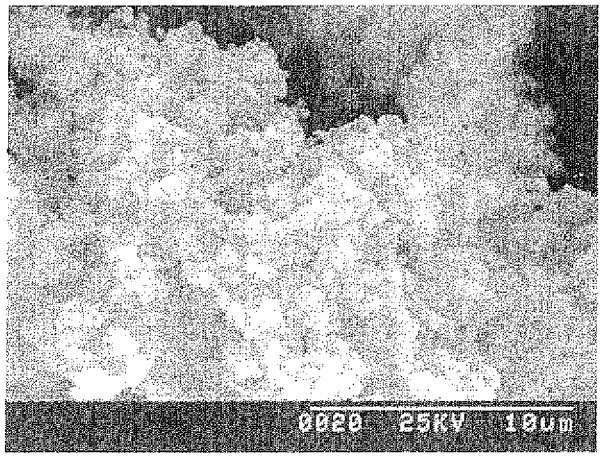
FIG. 17 shows a scanning electron micrograph of $MoS_2$ hydrothermally synthesized at 220° C. for 10 hours in an aqueous solution of 0.6M NaOH (an S:Mo ratio of 2.2:1).

1.2.2: Reaction Between $MoCl_5$ and Thiourea with the Addition of Sodium Hydroxide FIG. 16 shows an XRD pattern of $MoS_2$ hydrothermally synthesized at 220° C. for 10 hours with the addition of sodium hydroxide at an S:Mo ratio of 2.2:1 and that of $MoS_2$ precalcined at 400° C. for 5 hours in an argon stream. In the figure, "a" represents an aqueous 0.6 M NaOH solution, "b" represents an aqueous 0.9 M NaOH solution, "c" represents an aqueous 1.2 M NaOH solution, and "d" represents an aqueous 1.8 M NaOH solution. FIG. 17 shows a scanning electron micrograph of $MoS_2$ hydrothermally synthesized at 220° C. for 10 hours in an aqueous 0.6M NaOH solution (an S:Mo ratio of 2.2:1).

$MoS_2$ synthesized with the addition of sodium hydroxide had relatively high crystallinity and was composed of well-dispersed fine spherical particles.

1.2.3: Reaction Between $(NH_4)_3[PO_4Mo_{12}O] \cdot 3H_2O$ and Thiourea

Figure 18:
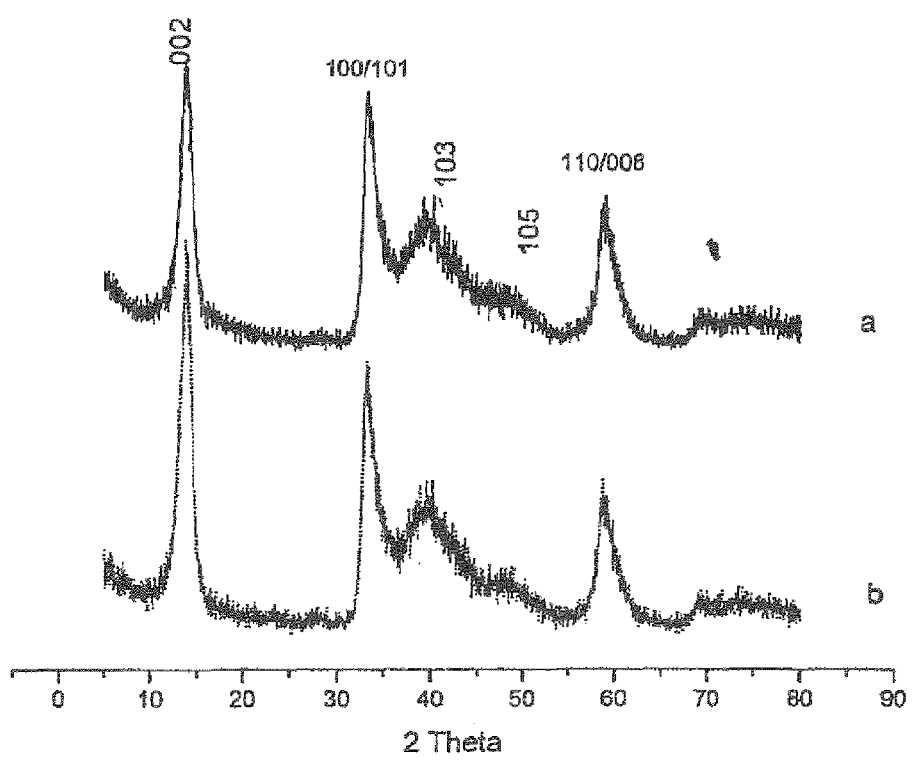
FIG. 18 shows an XRD pattern of a resultant of a hydrothermal reaction of $(NH_4)_3[PO_4Mo_{12}O].3H_2O$ and thiourea and that of a resultant of precalcination thereof.
Figure 19:
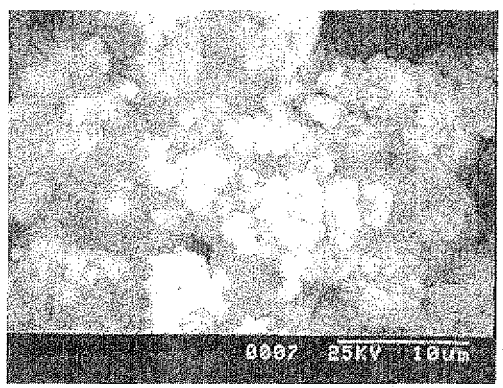
FIGS. 19A and 19B each show a scanning electron micrograph of a resultant of a hydrothermal reaction of $(NH_4)_3[PO_4Mo_{12}O].3H_2O$ and thiourea and that of a resultant of precalcination thereof.
Figure 19:
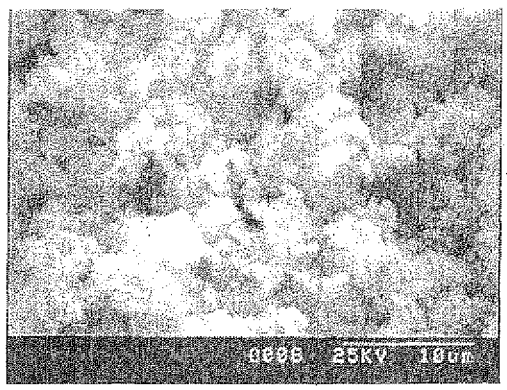
Figure 20:
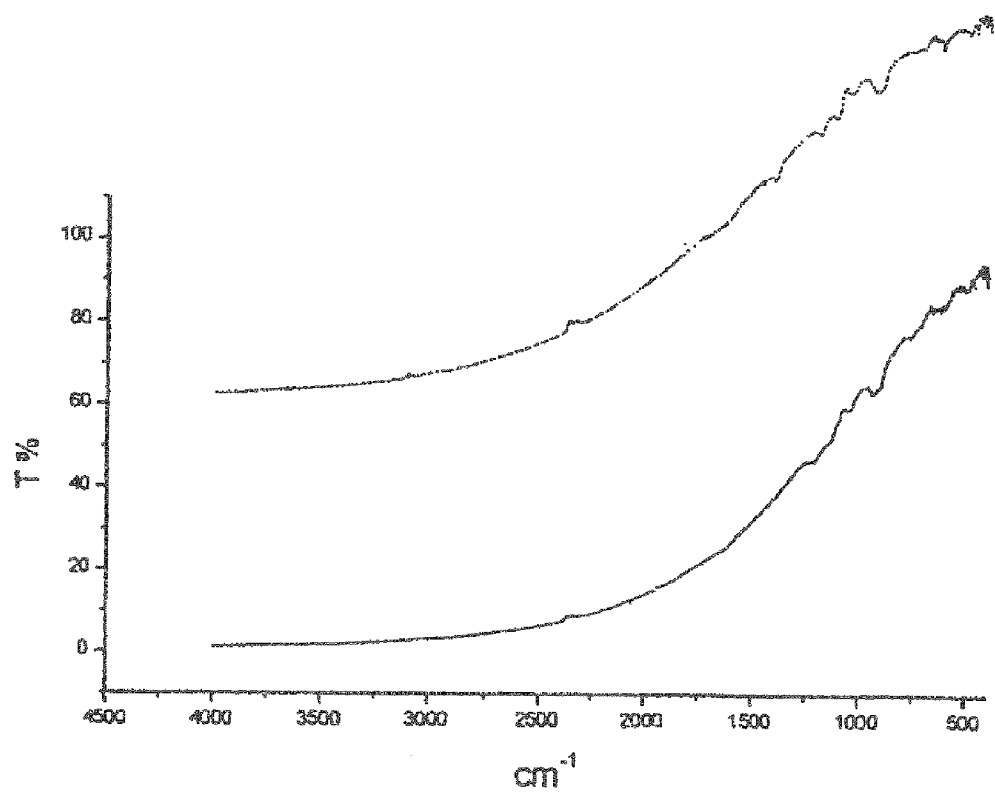
FIG. 20 shows the FTIR spectra of a resultant of a hydrothermal reaction of $(NH_4)_3[PO_4Mo_{12}O].3H_2O$ and thiourea and that of a resultant of precalcination thereof.

FIG. 18 shows an XRD pattern of a resultant of a hydrothermal reaction of $(NH_4)_3[PO_4Mo_{12}O] \cdot 3H_2O$ and thiourea and that of a resultant of precalcination thereof. FIGS. 19A and 19B each show a scanning electron micrograph of a resultant of a hydrothermal reaction of $(NH_4)_3[PO_4Mo_{12}O] \cdot 3H_2O$ and thiourea and that of a resultant of precalcination thereof. FIG. 20 shows the FTIR spectra of a resultant of a hydrothermal reaction of $(NH_4)_3[PO_4Mo_{12}O] \cdot 3H_2O$ and thiourea and that of a resultant of precalcination thereof. In these figures, "a" represents a product hydrothermally synthesized at 220° C. for 10 hours and "b" represents a product calcined at 400° C. for 5 hours.

The resulting product had high crystallinity, and crystallinity was not improved via precalcination. The sample was composed of fine particles having relatively high dispersibility. The FTIR spectra did not show any absorption resulting from organic matter.

1.2.4: Reaction Between $(NH_4)_6Mo_7O_{24} \cdot 4H_2O$ and Thiourea

Figure 21:
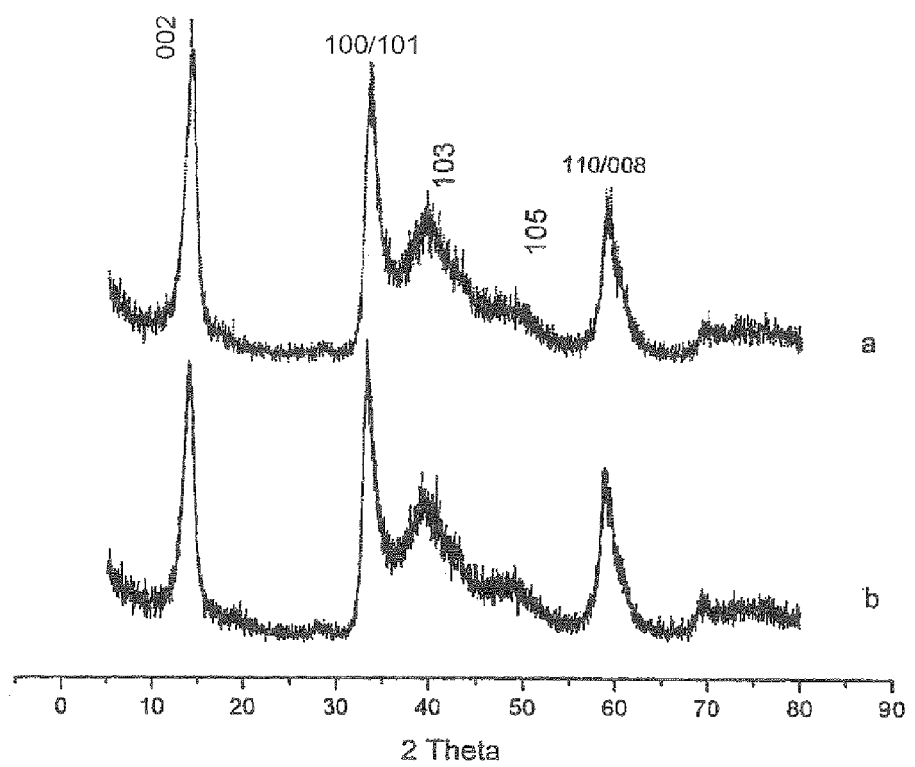
FIG. 21 shows an XRD pattern of a resultant of a hydrothermal reaction of $(NH_4)_6Mo_7O_{24}.4H_2O$ and thiourea and that of a resultant of precalcination thereof.
Figure 22:
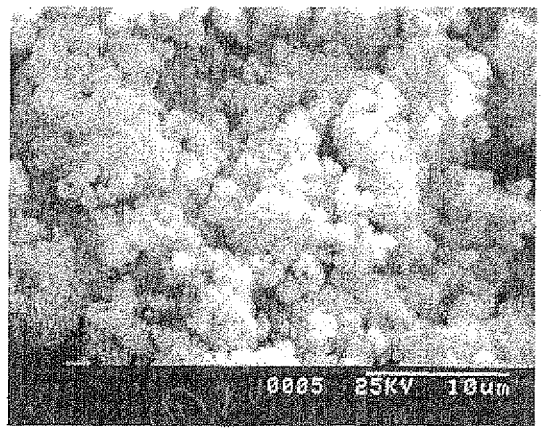
FIGS. 22A and 22B each show a scanning electron micrograph of a resultant of a hydrothermal reaction of $(NH_4)_6Mo_7O_{24}.4H_2O$ and thiourea and that of a resultant of precalcination thereof.
Figure 22:
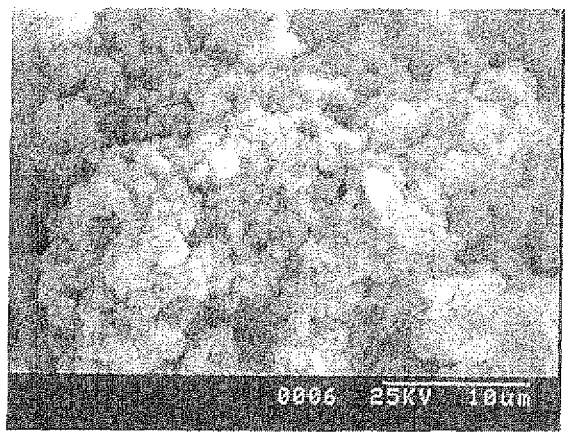
Figure 23:
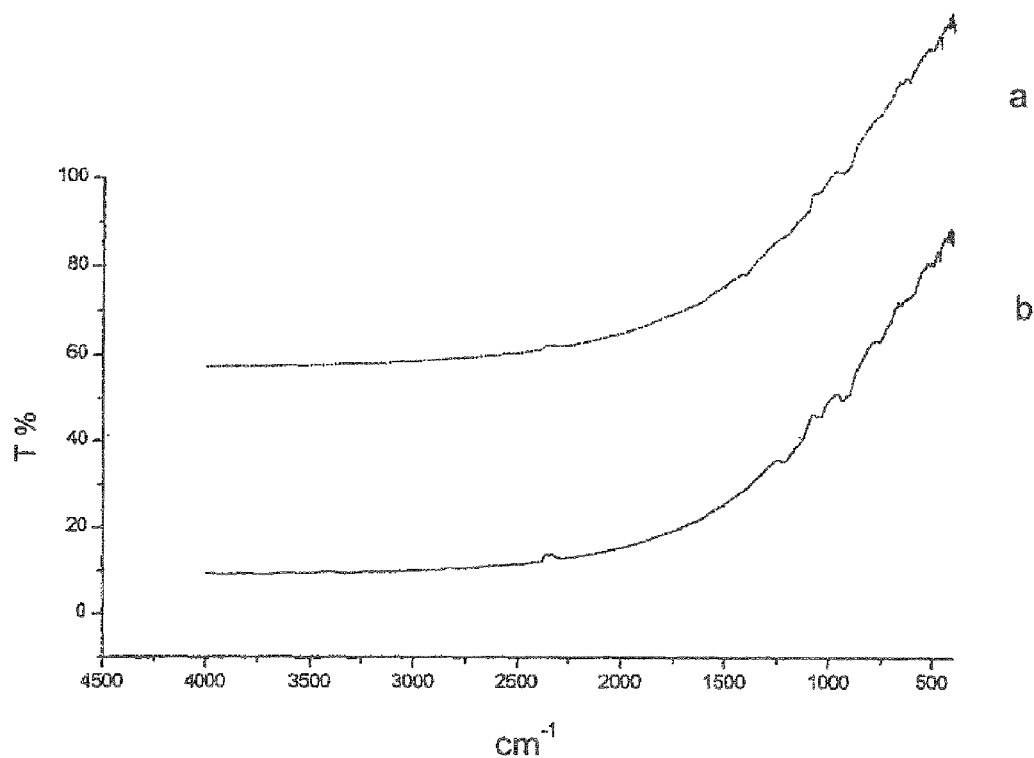
FIG. 23 shows the FTIR spectra of a resultant of a hydrothermal reaction of $(NH_4)_6Mo_7O_{24}.4H_2O$ and thiourea and that of a resultant of precalcination thereof.

FIG. 21 shows an XRD pattern of a resultant of a hydrothermal reaction of $(NH_4)_6Mo_7O_4 \cdot 4H_2O$ and thiourea and that of a resultant of precalcination thereof. FIGS. 22A and 22B each show a scanning electron micrograph of a resultant of a hydrothermal reaction of $(NH_4)_6Mo_7O_{24} \cdot 4H_2O$ and thiourea and that of a resultant of precalcination thereof. FIG. 22A shows a product hydrothermally synthesized at 220° C. for 10 hours, and FIG. 22B shows a product calcined in argon at 400° C. for 5 hours. FIG. 23 shows the FTIR spectra of a resultant of a hydrothermal reaction of $(NH_4)_6Mo_7O_{24} \cdot 4H_2O$ and thiourea and that of a resultant of precalcination thereof. In these figures, "a" represents a product hydrothermally synthesized at 220° C. for 10 hours and "b" represents a product calcined in argon at 400° C. for 5 hours.

The results attained with the use of $(NH_4)_6Mo_7O_{24} \cdot 4H_2O$ as a starting material were the same as those attained with the use of $(NH_4)_3[PO_4Mo_{12}O] \cdot 3H_2O$ as a starting material. The resulting product had high crystallinity, and crystallinity was not improved via precalcination. The sample was composed of fine particles having relatively high dispersibility. The FTIR spectra did not show any absorption resulting from organic matter.

EXAMPLE 2

Synthesis of $RuS_2$ $Ru(CO)_{12}$ was used as a starting material for Ru, S (solid sulfur) was used as a starting material for S, and xylene or distilled water was used as a solvent. A solvothermal or hydrothermal reaction was carried out at 220° C. for 10 hours. Thereafter, precalcination was carried out in an Ar atmosphere at 400° C. for 5 hours.

2.1: Synthesis of $RuS_2$ Via Solvothermal Reaction

Figure 24:
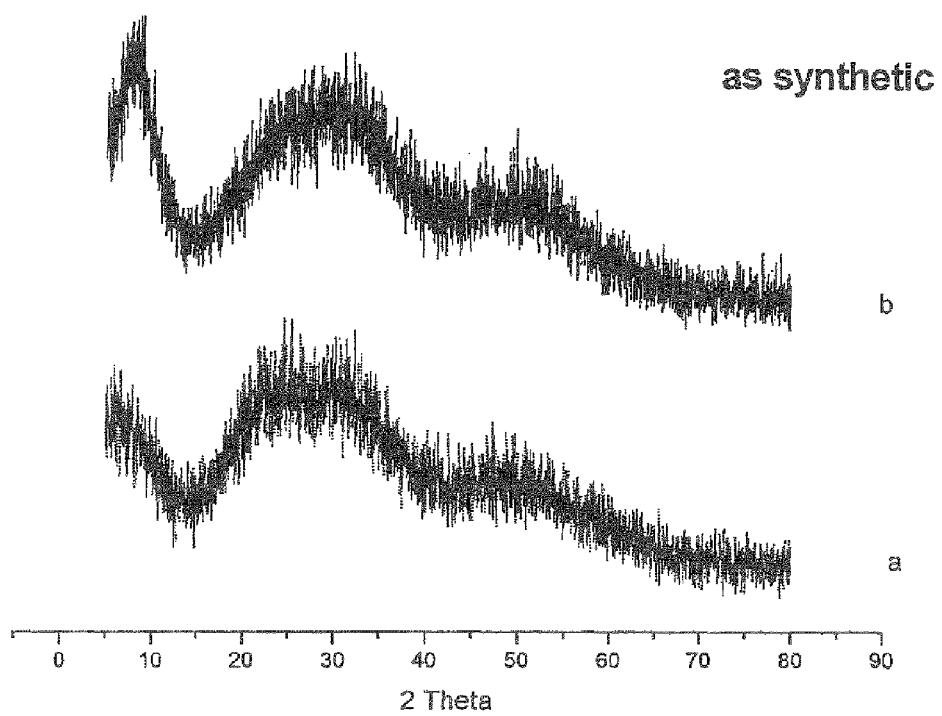
FIG. 24 shows an XRD pattern of $RuS_2$ synthesized via a solvothermal reaction at 220° C. for 10 hours while varying S:Ru ratios.

FIG. 24 shows an XRD pattern of $RuS_2$ synthesized via a solvothermal reaction at 220° C. for 10 hours while varying S:Ru ratios. In the figure, "a" represents an S:Ru ratio of 6:1, and "b" represents an S:Ru ratio of 4:1. Regardless of the S:Ru ratio, the product exhibited low crystallinity. The FTIR spectra of $RuS_2$ synthesized via a solvothermal reaction at 220° C. for 10 hours and a resultant of precalcination thereof shown in FIG. 28 demonstrate that the resultant of a solvothermal reaction contains organic matter. In the figure, "a" represents resulting $RuS_2$, and "b" represents a resultant of precalcination thereof.

Figure 25:
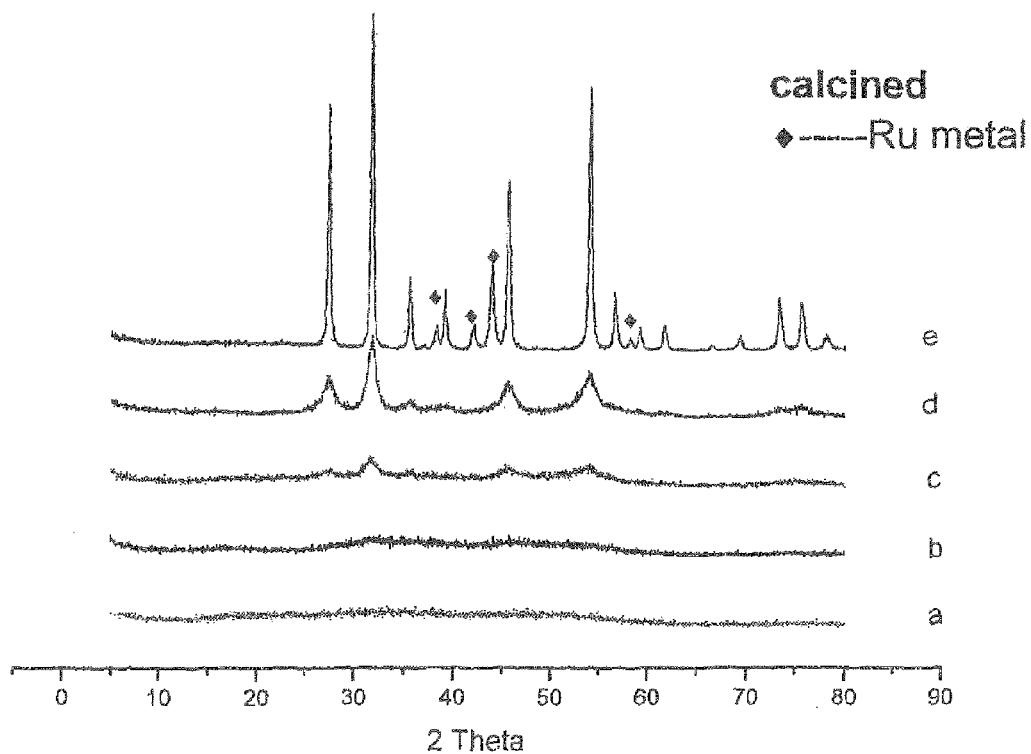
FIG. 25 shows an XRD pattern of a resultant of precalcination, in an argon stream at 400° C. for 5 hours, of $RuS_2$ synthesized via a solvothermal reaction at 220° C. for 10 hours.

FIG. 25 shows an XRD pattern of a resultant of precalcination, in an argon stream at 400° C. for 5 hours, of $RuS_2$ synthesized via a solvothermal reaction at 220° C. for 10 hours. In the figure, "a" represents an S:Ru ratio of 6:1 "b" represents an S:Ru ratio of 4:1, "c" represents an S:Ru ratio of 4.8:1, "d" represents an S:Ru ratio of 4.3:1, and "e" represents an S:Ru ratio of 4:1. Organic matter in the product was eliminated via precalcination. An S:Ru ratio of 4.8:1 or smaller was found to be necessary, so as to significantly change behavior because of S:Ru ratios and to cause crystallization via precalcination of a sample. When the S:Ru ratio was lowered to 4:1, crystallization was significantly advanced, and generation of an Ru metal also became observable.

Figure 26:
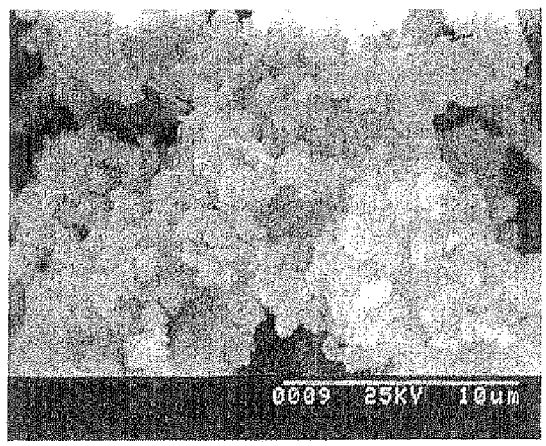
FIGS. 26A, 26B, and 26C each show a scanning electron micrograph of a resultant of precalcination, in an argon stream at 400° C. for 5 hours, of $RuS_2$ synthesized via a solvothermal reaction at 220° C. for 10 hours.
Figure 26:
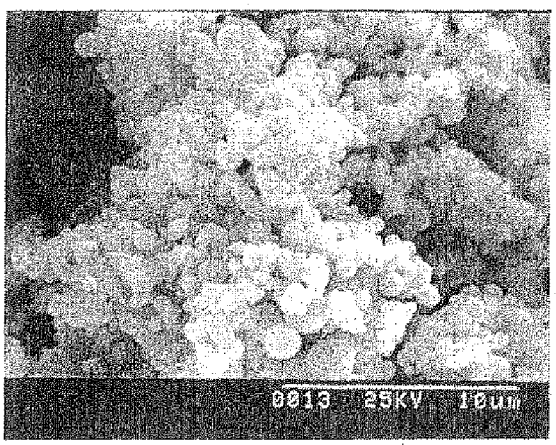
Figure 26:
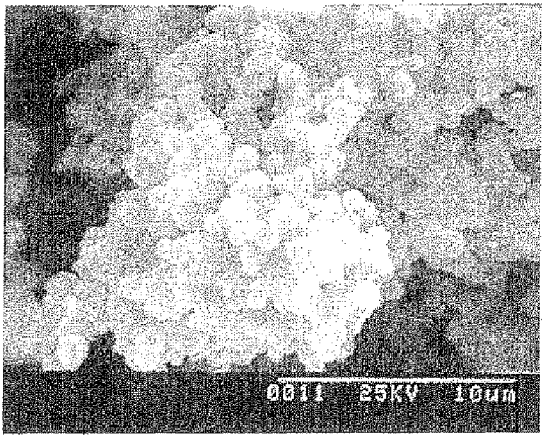
Figure 27:
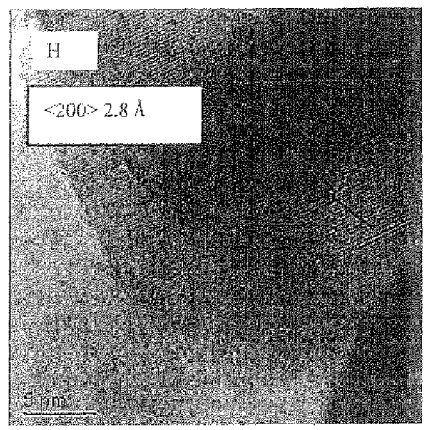
FIGS. 27A, 27B, 27C, and 27D each show a transmission electron micrograph of a resultant of precalcination of $RuS_2$.
Figure 27:
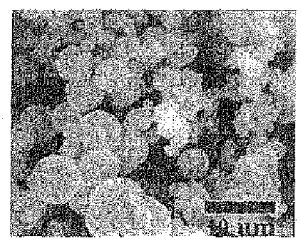
Figure 27:
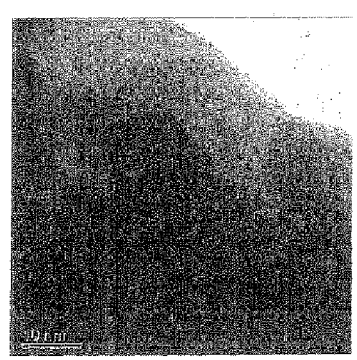
Figure 27:
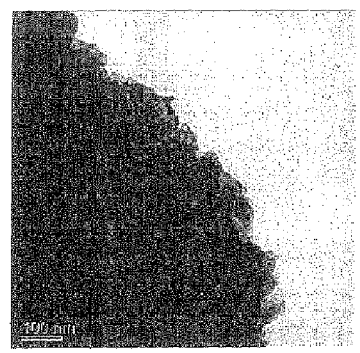

FIGS. 76A, 26B, and 26C each show a scanning electron micrograph of a resultant of precalcination, in an argon stream at 400° C. for 5 hours, of $RuS_2$ synthesized via a solvothermal reaction at 220° C. for 1.0 hours. In the figure, "s" represents an S:Ru ratio of 4:1, "b" represents an S:Ru ratio of 4.3:1, and "c" represents an S:Ru ratio of 6:1. Spherical particles of about 1 μm were aggregated, and the S:Ru ratio did not significantly influence powder or particle configurations. Transmission electron micrographs of a resultant of precalcination of $RuS_2$ shown in FIGS. 27A, 27B, 27C, and 27D demonstrate that precalcined spherical particles were fine particles and that each particle exhibits a lattice image, indicating satisfactory crystallization.

Figure 28:
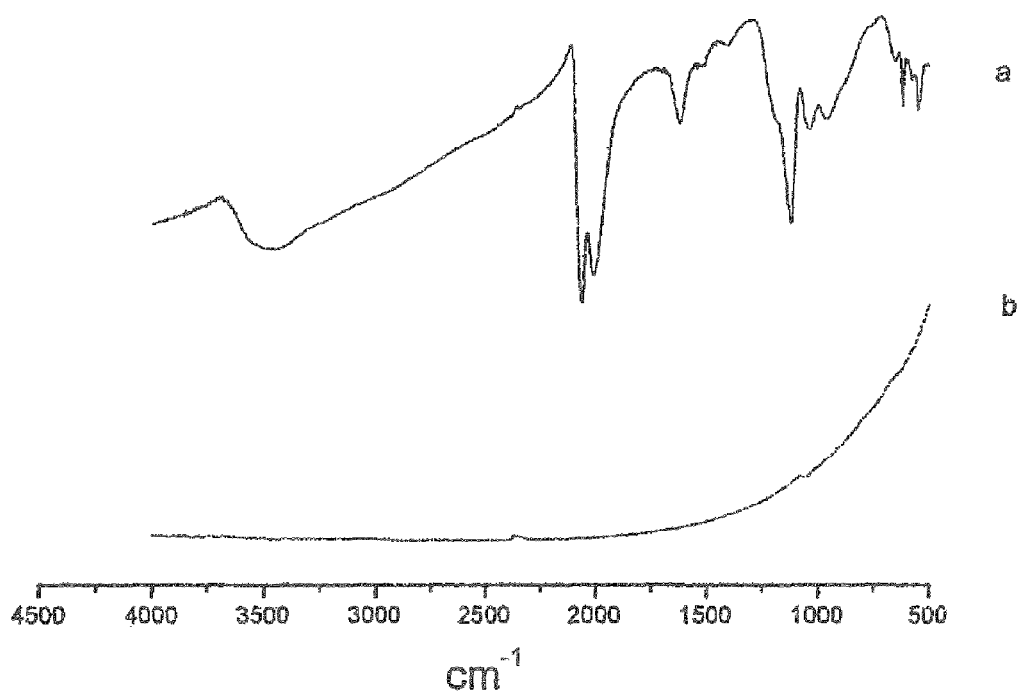
FIG. 28 shows the FTIR spectra of $RuS_2$ synthesized via a solvothermal reaction (an S:Ru ratio of 4:1) and that of a resultant of precalcination thereof at 400° C.

FIG. 28 shows the FTIR spectra of $RuS_2$ synthesized via a solvothermal reaction (with an S:Ru ratio of 4:1) and that of a resultant of precalcination thereof at 400° C. the figure, "a" represents a product of hydrothermal synthesis, and "b" represents a resultant of precalcination thereof.

2.2: Synthesis of RuS2 Via Hydrothermal Reaction

Figure 29:
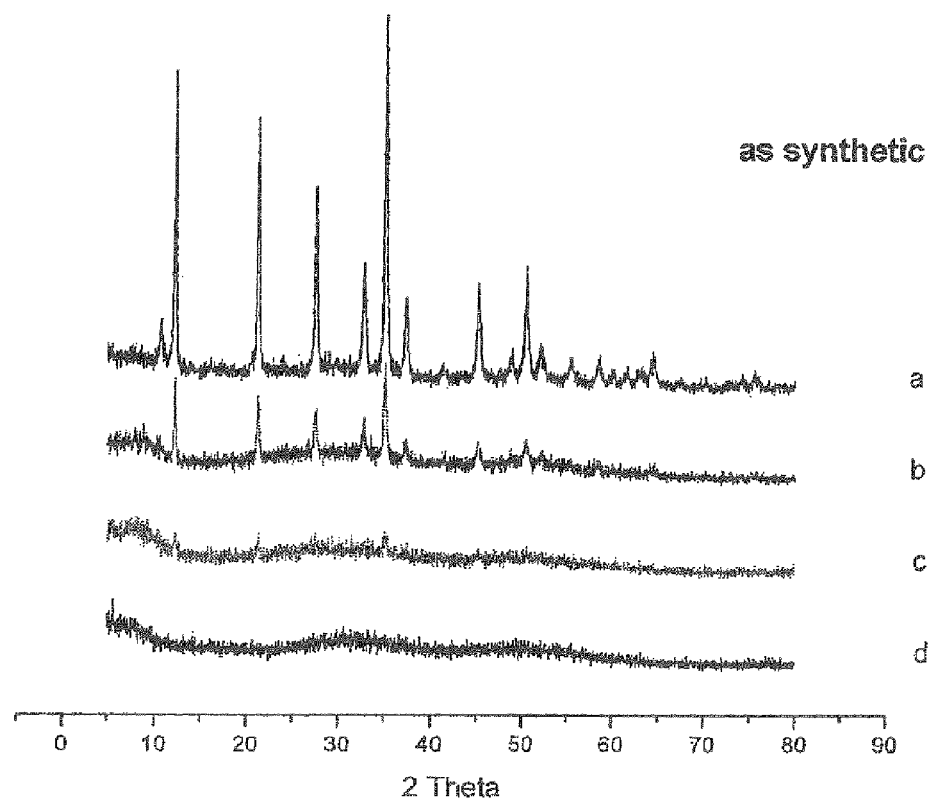
FIG. 29 shows an XRD pattern of $RuS_2$ resulting from a hydrothermal reaction at 220° C. for 10 hours.
Figure 30:
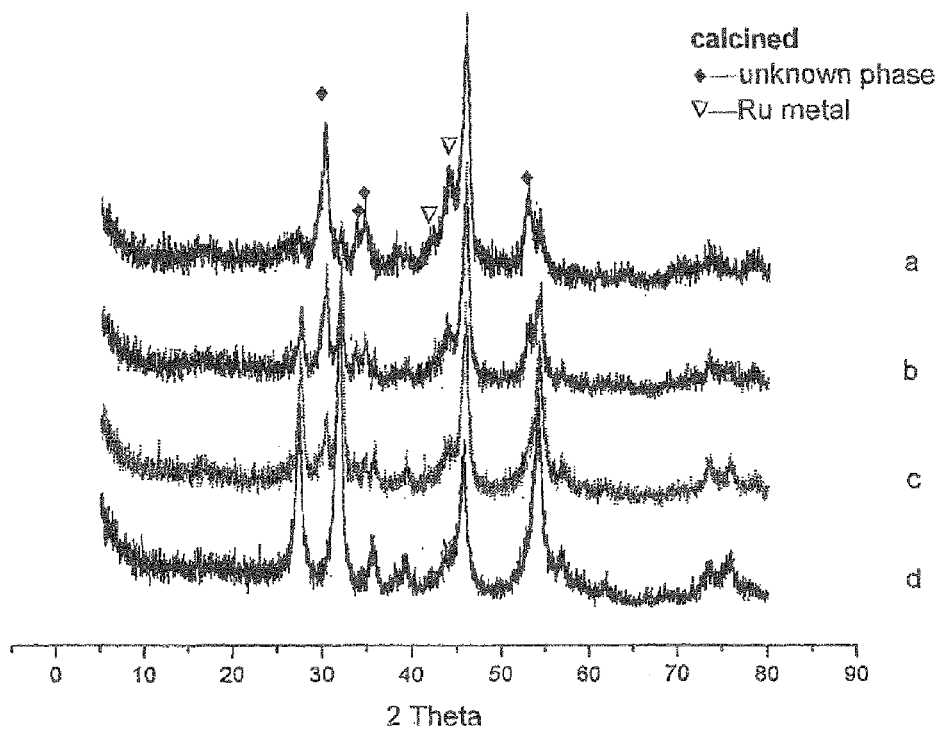
FIG. 30 shows an XRD pattern of a resultant of precalcination, at 400° C. for 5 hours, of $RuS_2$ resulting from a hydrothermal reaction at 220° C. for 10 hours.
Figure 31:
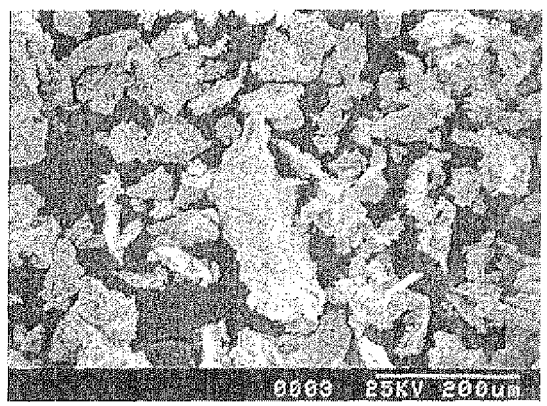
FIGS. 31A and 31B each show a scanning electron micrograph of $RuS_2$ and that of a resultant of precalcination thereof.
Figure 31:
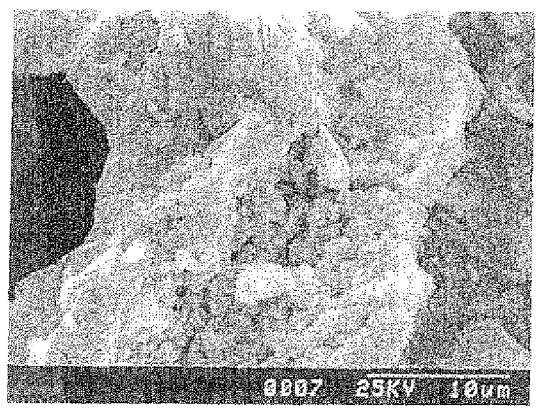

FIG. 29 shows an XRD pattern of RuS2 resulting from a hydrothermal reaction at 220° C. for 10 hours. FIG. 30 shows an XRD pattern of a resultant of precalcination, at 400° C. for 5 hours, of $RuS_2$ resulting from a hydrothermal reaction at 220° C. for 10 hours. In these figures, "a" represents an S:Ru ratio of 2:1, "b" represents an S:Ru ratio of 2.8:1, "c" represents an S:Ru ratio of 3.6:1, and "d" represents an S:Ru ratio of 4.4:1. Further, FIGS. 31A and 31B each show a scanning electron micrograph of $RuS_2$ and that of a resultant of precalcination thereof. FIG. 31A shows a product, $RuS_2$, attained at an S:Ru ratio of 4.4:1, and FIG. 31B shows a resultant of precalcination thereof at 400° C. for 5 hours.

At an S:Ru ratio of 3.6:1 or lower, a crystal phase was generated in the resulting product, although a phase could not be identified. This phase is considered to contain organic matter. The non-crystalline phase attained at an S:Ru ratio of 4.4:1 became crystallized into $RuS_2$ via precalcination. At an S:Ru ratio of 2.8:1 or lower, an unidentified phase was also observed in a resultant of precalcination. At an S:Ru ratio of 2.0:1, generation of an Ru metal was observed.

EXAMPLE 3

Synthesis of $Rh_2S_3$ $Rh_6(CO)_{16}$ was used as a starting material for Rh, S (solid sulfur) was used as a starting material for S, and xylene or distilled water was used as a solvent. A solvothermal or hydrothermal reaction was carried out at 220° C. for 10 hours. Thereafter, precalcination was carried out in an Ar atmosphere at 400° C. for 5 hours (partially at 750° C.).

3.1: Synthesis of $Rh_2S_3$ Via Solvothermal Reaction

Figure 32:
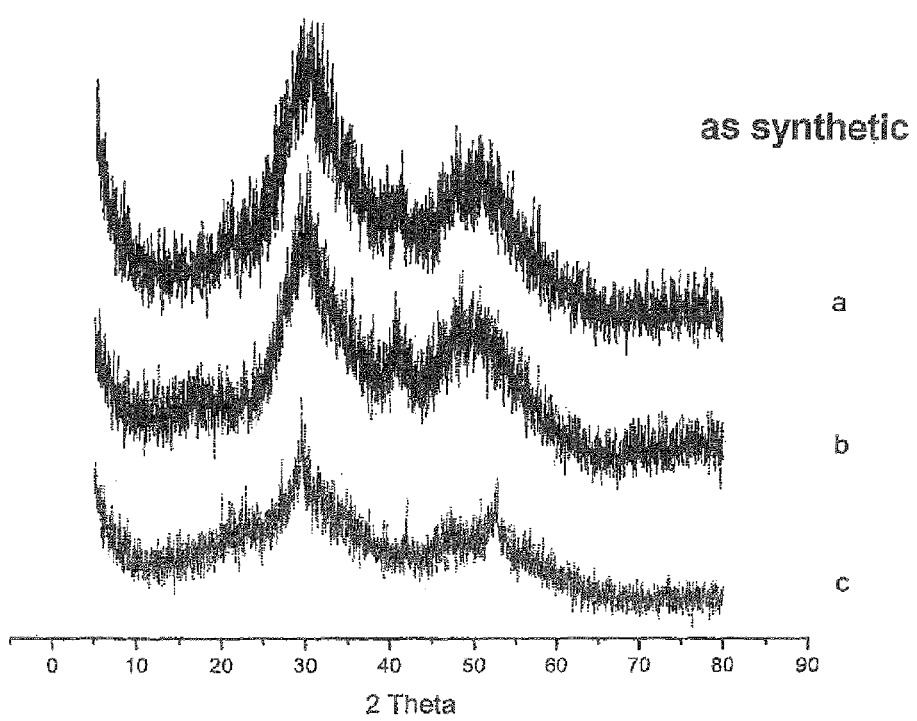
FIG. 32 shows an XRD pattern of $Rh_2S_3$ synthesized via a solvothermal reaction at 220° C. for 10 hours.
Figure 33:
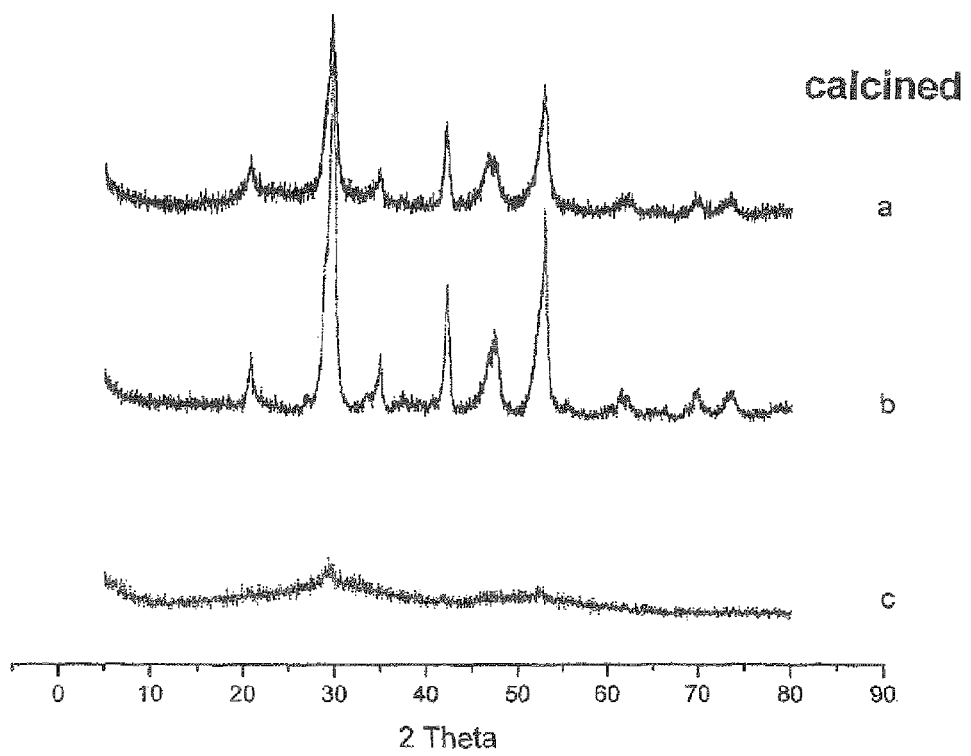
FIG. 33 shows an XRD pattern of a resultant of precalcination, in an argon stream at 400° C. for 5 hours, of $Rh_2S_3$ synthesized via a solvothermal reaction at 220° C. for 10 hours.
Figure 34:
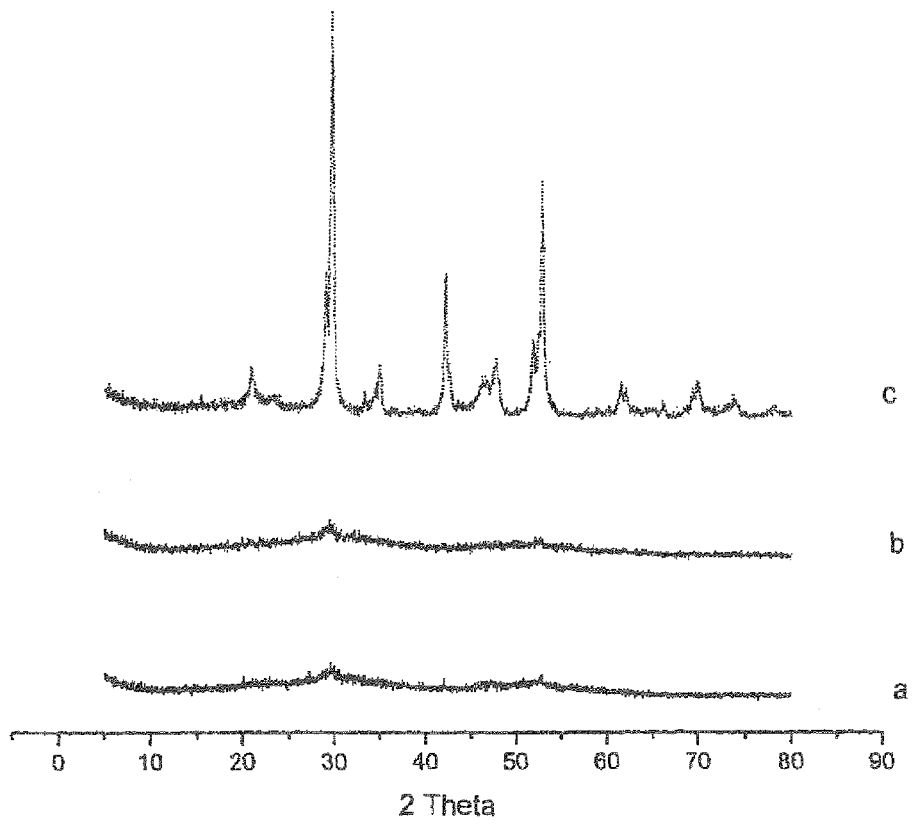
FIG. 34 shows an XRD pattern of $Rh_2S_3$ synthesized via a solvothermal reaction at 220° C. for 10 hours at an S:Rh ratio of 5.0:1 and that of a resultant of precalcination thereof in an argon stream at 400° C. for 5 hours and at 750° C. for 5 hours.
Figure 35:
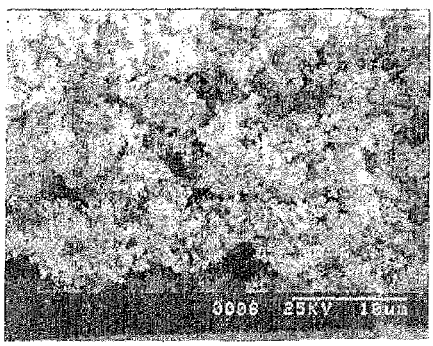
FIGS. 35A, 35B, 35C, and 35D each show a scanning electron micrograph of $Rh_2S_3$ resulting from a solvothermal reaction and a resultant of precalcination thereof.
Figure 35:
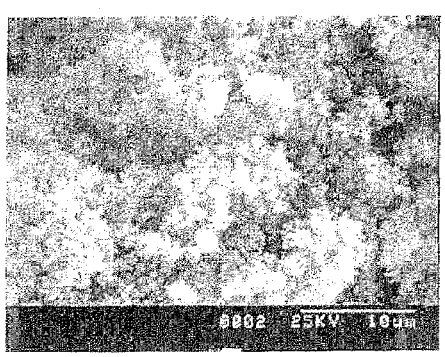
Figure 35:
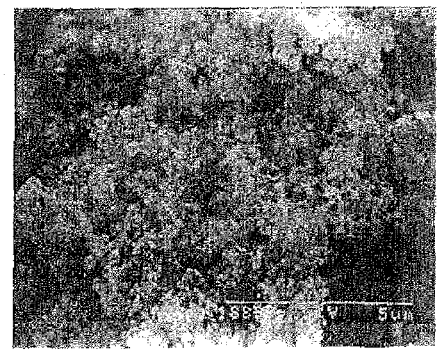
Figure 35:
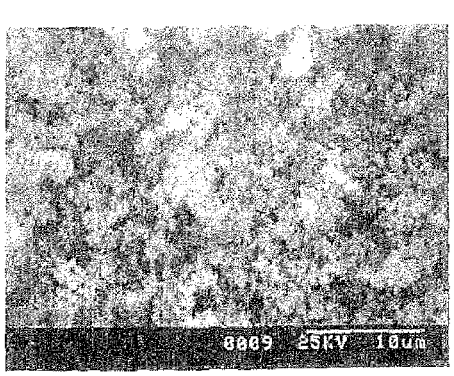

FIG. 32 shows an XRD pattern of $Rh_2S_3$ synthesized via a solvothermal reaction at 220° C. for 10 hours. FIG. 33 shows an XRD pattern of a resultant of precalcination, in an argon stream at 400° C. for 5 hours, of $Rh_2S_3$ synthesized via a solvothermal reaction at 220° C. for 10 hours. In these figures, "a" represents an S:Rh ratio of 1.5:1, "b" represents an S:Rh ratio of 3.6:1, and "c" represents an S:Rh ratio of 5.0:1. FIG. 34 shows an XRD pattern of $Rh_2S_3$ synthesized via a solvothermal reaction at 220° C. for 10 hours at an S:Rh ratio of 5.0:1 and that of a resultant of precalcination thereof in an Ar stream at 400° C. for 5 hours and at 750° C. for 5 hours. In the figure, "a" represents a product, $Rh_2S_3$, of a solvothermal reaction, "b" represents a resultant of precalcination thereof in an Ar stream at 400° C. for 5 hours, and "c" represents a resultant of precalcination thereof in an Ar stream at 750° C. for 5 hours.

A product of a solvothermal reaction, $Rh_2S_3$, exhibited low crystallinity; however, crystallization was remarkably advanced via precalcination thereof. Crystallization resulting from precalcination is influenced by the S:Rh ratio. At an S:Rh ratio of 3.6:1 or lower, crystallization occurred; however, crystallization did not occur at an S:Rh ratio of 5.0:1. By raising the precalcination temperature to 750° C., the sample became crystallized at an S:Rh ratio of 5:1.

FIGS. 35A, 35B, 35C, and 35D each show a scanning electron micrograph of $Rh_2S_3$ resulting from a solvothermal reaction and a resultant of precalcination thereof. In the figures, "a" represents a product of a solvothermal reaction attained at an S:Rh ratio of 3.6:1, "b" represents a resultant of calcination thereof at 400° C., "c" represents a product of a solvothermal reaction attained at an S:Rh ratio of 5.0:1, and "d" represents a resultant of calcination thereof at 400° C. The products were composed of very fine particles, regardless of the S:Rh ratio, and no change was observed via precalcination.

3.2: Synthesis of $Rh_2S_3$ Via Hydrothermal Reaction

Figure 36:
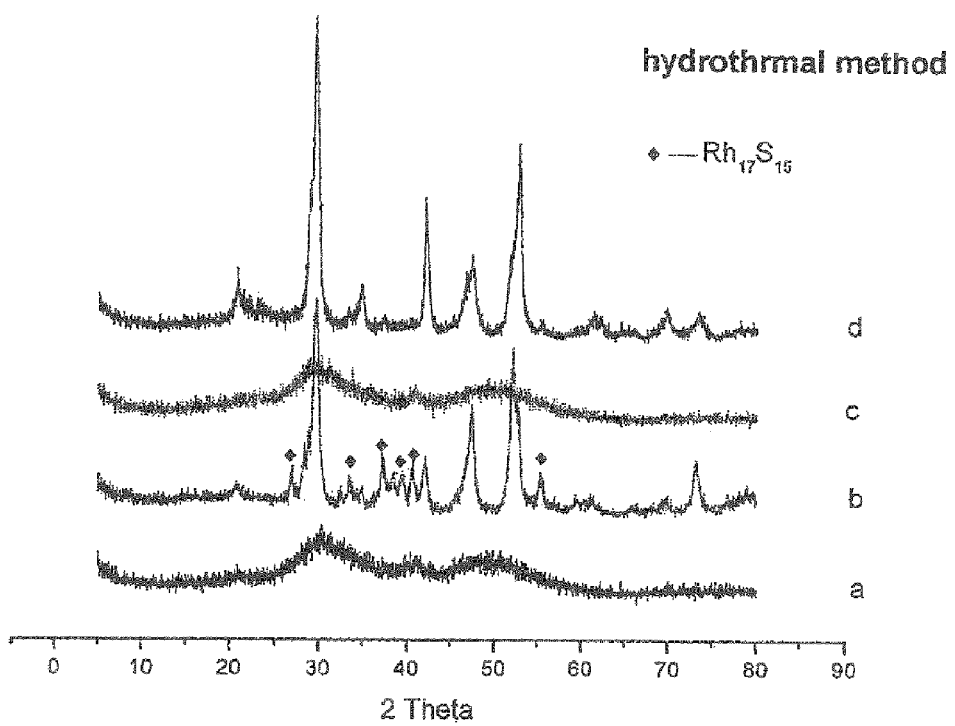
FIG. 36 shows an XRD pattern of $Rh_2S_3$ resulting from a hydrothermal reaction and that of a resultant of precalcination thereof.

FIG. 36 shows an XRD pattern of $Rh_2S_3$ resulting from a hydrothermal reaction and that of a resultant of precalcination thereof. In the figure, "a" represents a product of a hydrothermal reaction attained at an S:Rh ratio of 1.5:1 "b" represents a resultant of calcination thereof at 400° C., "c" represents a product of a hydrothermal reaction attained at an S:Rh ratio of 3.0:1 and "d" represents a resultant of calcination thereof at 400° C.

A product of a hydrothermal reaction, $Rh_2S_3$, exhibited low crystallinity, regardless of the S:Rh ratio: however, crystallization was remarkably advanced via precalcination. At an S:Rh ratio of 1.5:1, a resultant of precalcination contained purities, and a phase of interest was more likely to be obtained at an S:Rh ratio of 3.0:1.

Figure 37:
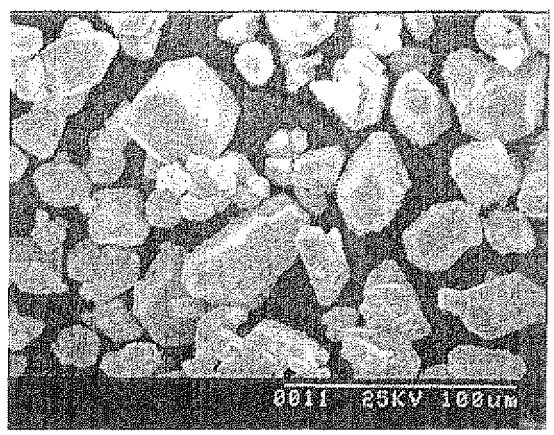
FIGS. 37A and 37B each show an electron micrograph of $Rh_2S_3$ resulting from a hydrothermal reaction and that of a resultant of precalcination thereof.
Figure 37:
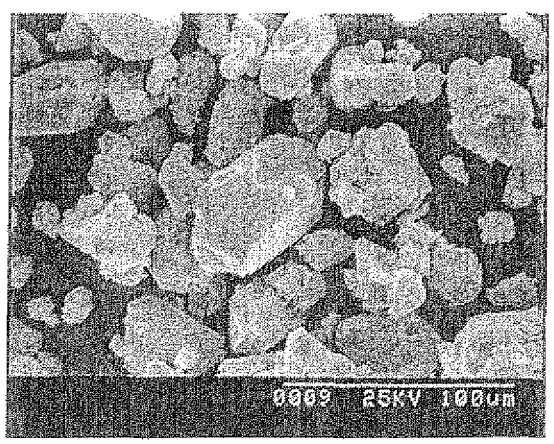

FIGS. 37A and 37B each show an electron micrograph of $Rh_2S_3$ resulting from a hydrothermal reaction and that of a resultant of precalcination thereof. In the figures, "a" represents a resultant of calcination at 400° C. of a product of a hydrothermal reaction at an S:Rh ratio of 1.5:1 and "b" represents a resultant of calcination at 400° C. of a product of a hydrothermal reaction at an S:Rh ratio of 3.0:1. The product of the hydrothermal reaction was partially idiomorphic and grown to become a larger crystal. While the XRD pattern exhibits noncrystalline properties, the crystal assuredly grew, which is an inexplicable phenomenon.

Figure 38:
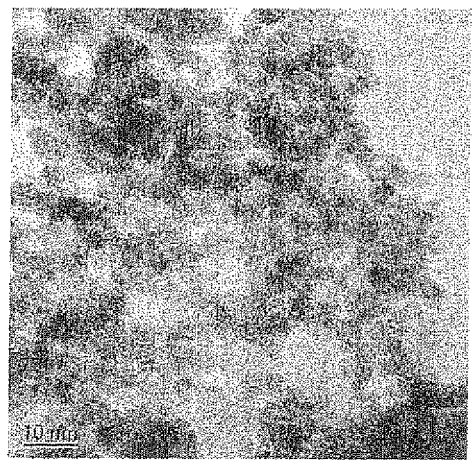
FIGS. 38A and 38B each show an electron micrograph and an electron diffraction diagram of $Rh_2S_3$ resulting from a hydrothermal reaction (an S:Rh ratio of 3.0:1).
Figure 38:
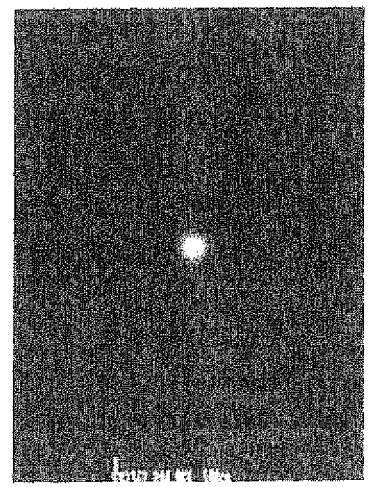
Figure 39:
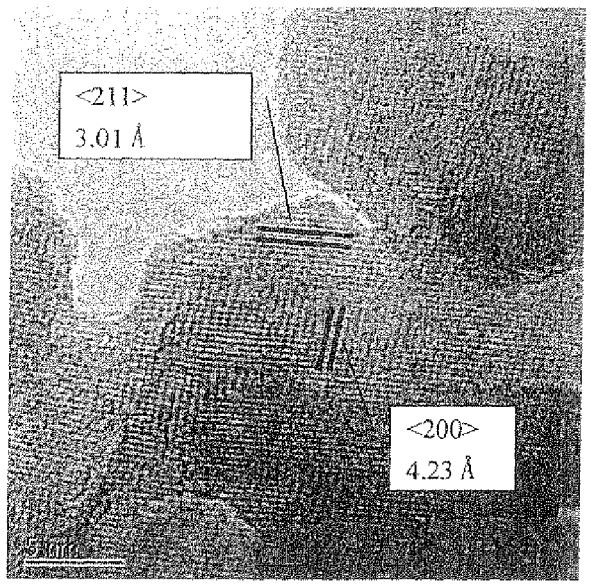
FIGS. 39A and 39B each show an electron micrograph and an electron diffraction diagram of a resultant of calcination of $Rh_2S_3$ resulting from a hydrothermal reaction at 400° C. (an S:Rh ratio of 3.0:1).
Figure 39:
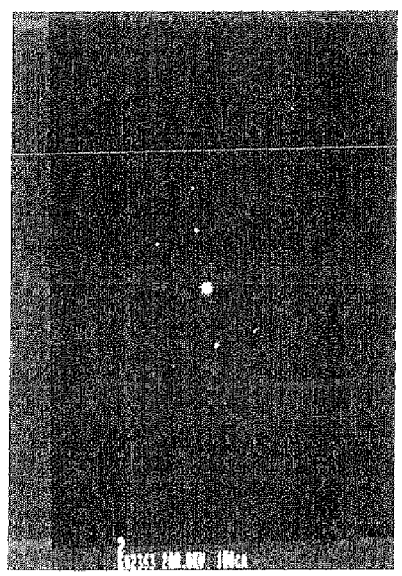

FIGS. 38A and 38B each show an electron micrograph and an electron diffraction diagram of $Rh_2S_3$ resulting from a hydrothermal reaction at an S:Rh ratio of 3.0:1. FIGS. 39A and 39B each show an electron micrograph and an electron diffraction diagram of a resultant of calcination at 400° C. of $Rh_2S_3$ resulting from a hydrothermal reaction at an S:Rh ratio of 3.0:1. Growth of crystals described above was verified by the transmission electron micrograph or the electron diffraction diagram shown in FIGS. 38A, 38B, 39A, and 39B.

Figure 40:
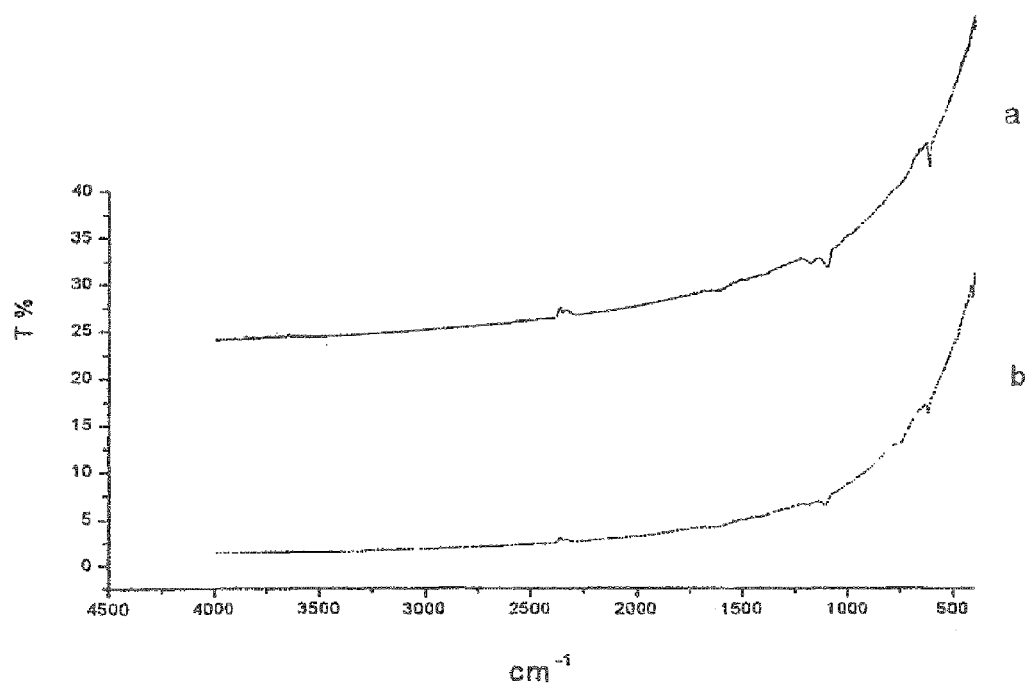
FIG. 40 shows the FTIR spectra of hydrothermally synthesized $Rh_2S_3$ (an S:Rh ratio of 3:1) and a resultant of precalcination thereof at 400° C.

FIG. 40 shows the FTIR spectra of hydrothermally synthesized $Rh_2S_3$ (with an S:Rh ratio of 3:1) and a resultant of precalcination thereof at 400° C. In the figure, "a" represents a product of hydrothermal synthesis, and "b" represents a resultant of precalcination thereof. The IR spectra shown in FIG. 40 demonstrate that the product of the hydrothermal reaction did not contain any organic matter.

EXAMPLE 4

Synthesis of $ReS_2$ $Re_2(CO)_{10}$ was used as a starting material for Re, S (solid sulfur) was used as a starting material for S, and xylene or distilled water was used as a solvent. A solvothermal or hydrothermal reaction was carried out at 220° C. for 10 hours. Thereafter, precalcination was carried out in an Ar atmosphere at 400° C. or 750° C. for 5 hours.

4.1: Synthesis of $ReS_2$ Via Solvothermal Reaction

Figure 41:
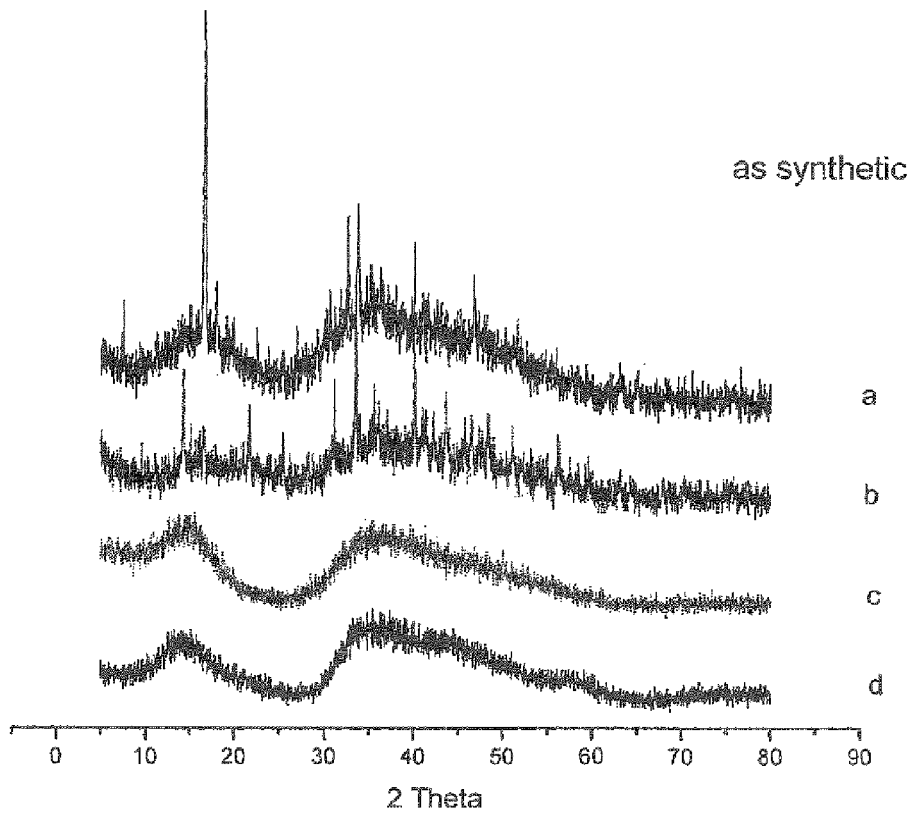
FIG. 41 shows an XRD pattern of $ReS_2$ synthesized via a solvothermal reaction at 220° C. for 10 hours.
Figure 42:
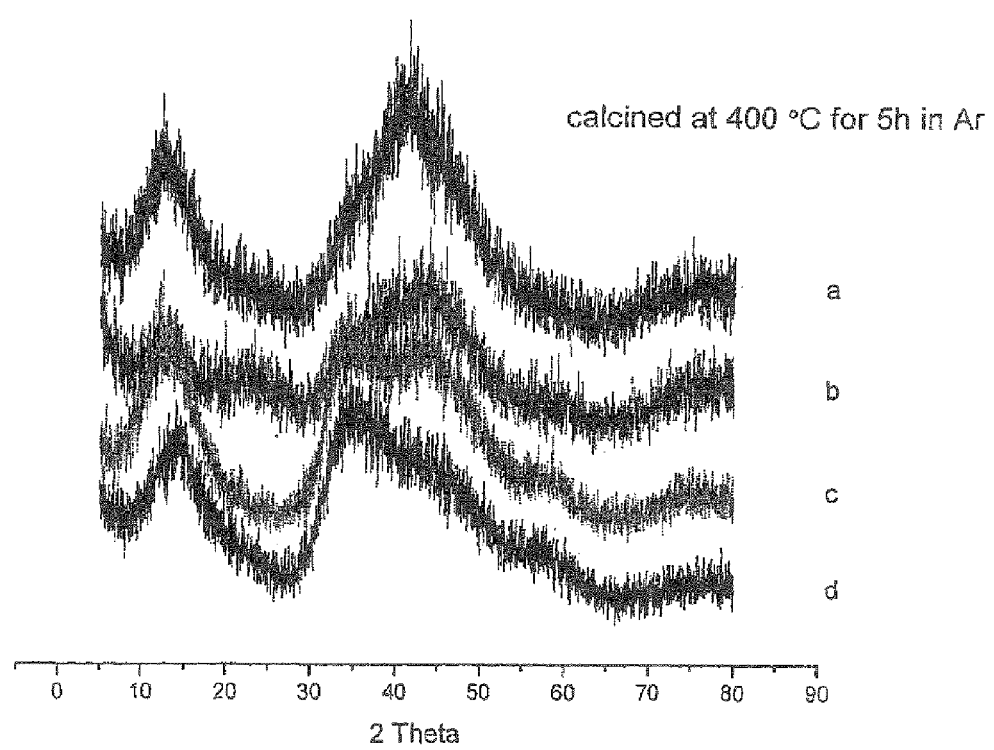
FIG. 42 shows an XRD pattern of a resultant of precalcination, in an argon stream at 400° C. for 5 hours, of $ReS_2$ synthesized via a solvothermal reaction at 220° C. for 10 hours.

FIG. 41 shows an XRD pattern of $ReS_2$ synthesized via a solvothermal reaction at 220° C. for 10 hours. FIG. 42 shows an XRD pattern of a resultant of precalcination in an Ar stream at 400° C. for 5 hours of $ReS_2$ synthesized via a solvothermal reaction at 220° C. for 10 hours. In the figures, "a" represents an S:Re ratio of 1.32:1, "b" represents an S:Re ratio of 2:1, "c" represents an S:Re ratio of 4:1, and "d" represents an S:Re ratio of 9:1.

When the S:Re ratio was lower than 2:1, a very sharp diffraction line was observed in addition to a broad diffraction line obtained from a low-crystalline substance, although this sharp line could not be identified. Since this diffraction line disappears upon precalcination, this line is considered to be derived from organic matter. When a sample was precalcined at 400° C. and the S:Re ratio was lower than 2:1, a diffraction line at around 40° C. did not separate at all, and the behavior was different from that of a sample with a higher S:Re ratio.

Figure 43:
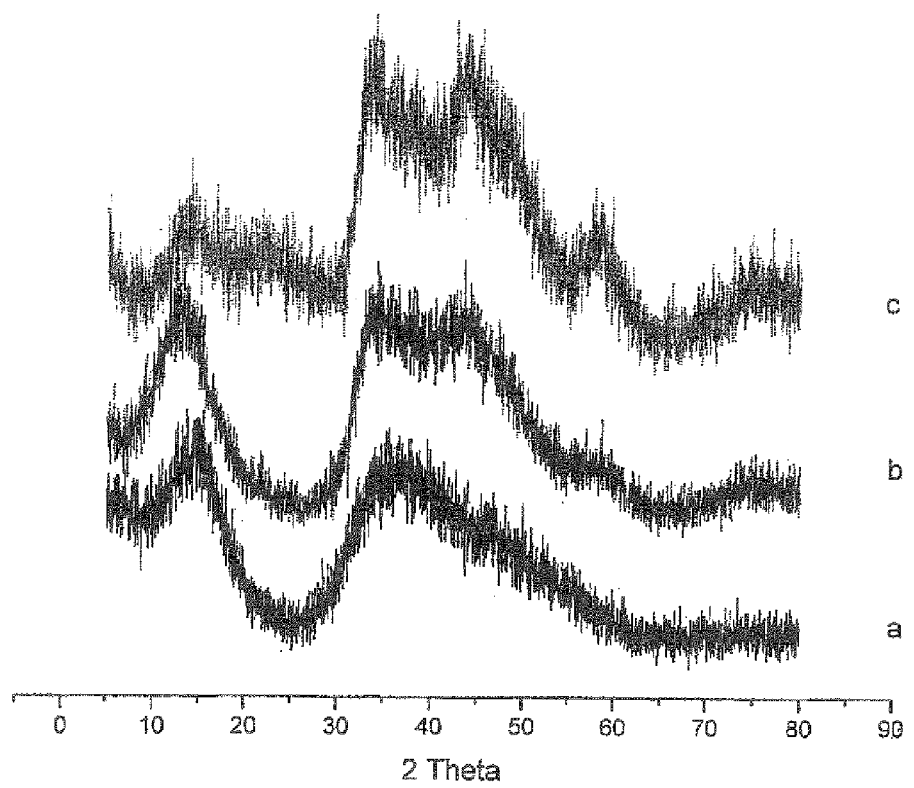
FIG. 43 shows an XRD pattern of $ReS_2$ obtained at an S:Re ratio of 4:1 and that of a resultant of precalcination thereof.
Figure 44:
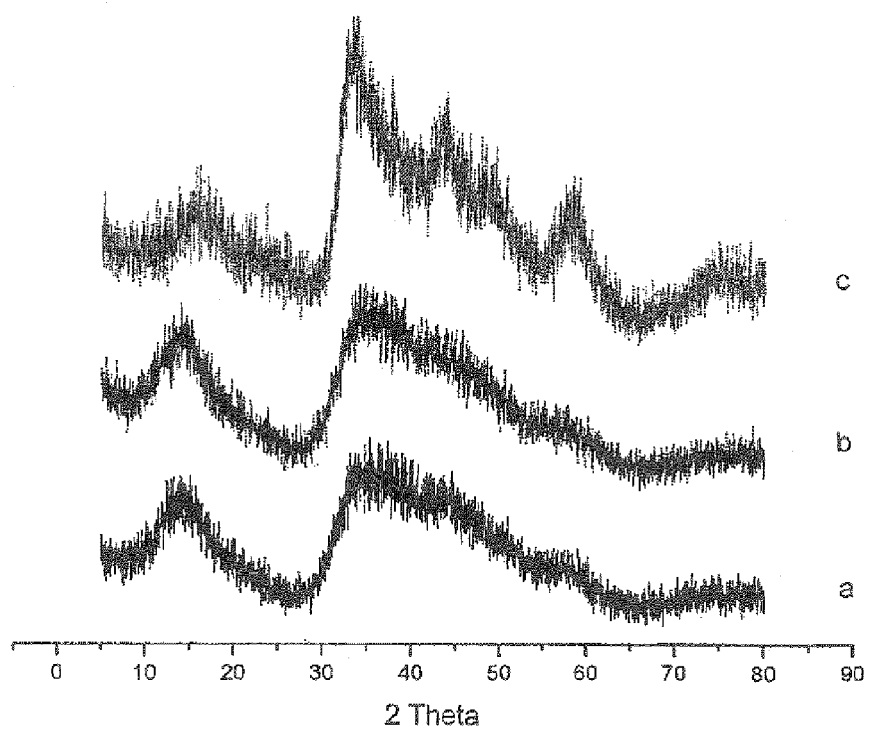
FIG. 44 shows an XRD pattern of $ReS_2$ obtained at an S:Re ratio of 9:1 and that of a resultant of precalcination thereof.
Figure 45:
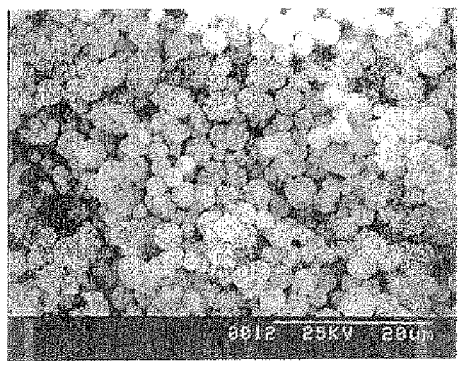
FIGS. 45A, 45B, 45C, and 45D each show a scanning electron micrograph of $ReS_2$ resulting from a solvothermal reaction and that of a resultant of precalcination thereof.
Figure 45:
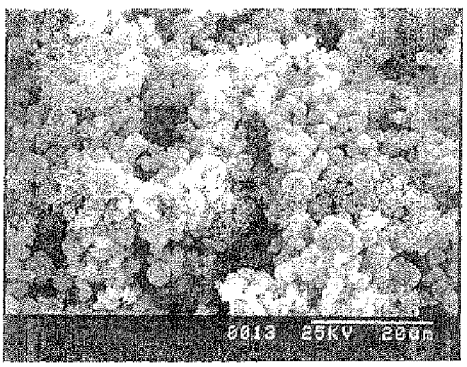
Figure 45:
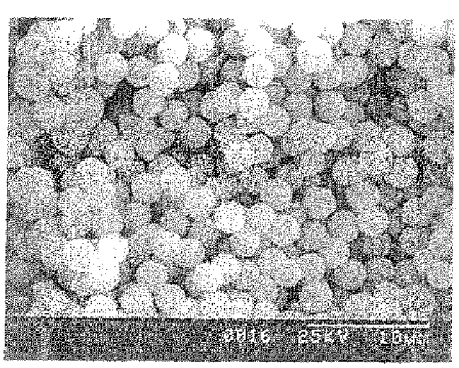
Figure 45:

FIG. 43 shows an XRD pattern of $ReS_2$ obtained at an S:Re ratio of 4:1 and that of a resultant of precalcination thereof. In the figure, "a" represents a product, $ReS_2$, of a solvothermal reaction, "b" represents a resultant of precalcination thereof at 400° C., and "c" represents a resultant of precalcination thereof at 750° C. FIG. 44 shows an XRD pattern of $ReS_2$ obtained at an S:Re ratio of 9:1 and that of a resultant of precalcination thereof. In the figure, "a" represents a product, $ReS_2$, of a solvothermal reaction, "b" represents a resultant of precalcination thereof at 400° C., and "c" represents a resultant of precalcination thereof at 750° C. Crystallinity is enhanced via calcination at 750° C.; however, the diffraction line remains broad and the sample is not considered to be completely crystallized.

FIGS. 45A, 45B, 45C, and 45D each show a scanning electron micrograph of $ReS_2$ resulting from a solvothermal reaction and that of a resultant of precalcination thereof. In the figures, "a" represents a product of a solvothermal reaction at an S:Re ratio of 4:1 "b" represents a resultant of precalcination thereof at 400° C., "c" represents a product of a solvothermal reaction at an S:Re ratio of 2:1, and "d" represents a resultant of precalcination thereof at 400° C. The resultant was composed of spherical particles. When the S:Re ratio was 2:1, in particular, the size was homogeneous. When the S:Re ratio was 4:1, however, the particle diameter distribution became broadened.

Figure 46:
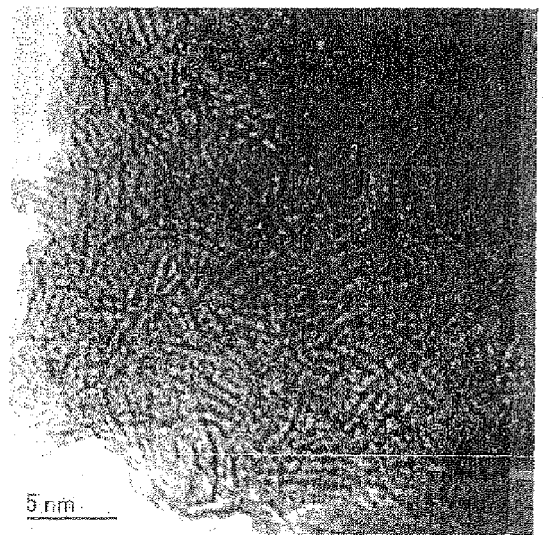
FIGS. 46A and 46B each show an electron micrograph and an electron diffraction diagram of $ReS_2$ resulting from a solvothermal reaction at an S:Rh ratio of 90:1 and those of a resultant of calcination thereof at 750° C.
Figure 46:
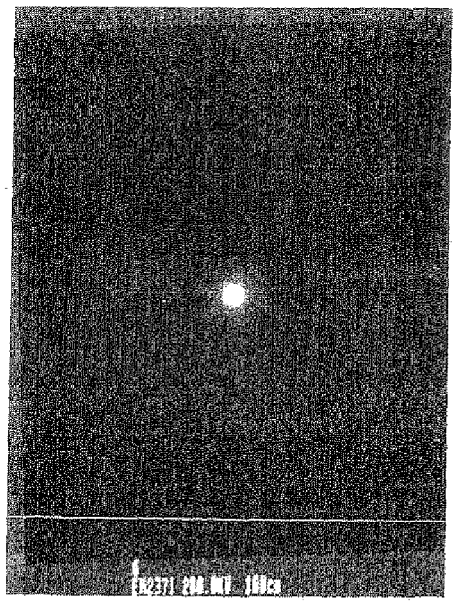

FIGS. 46A and 46B each show an electron micrograph and an electron diffraction diagram of $ReS_2$ resulting from a solvothermal reaction at an S:Rh ratio of 9.0:1 and those of a resultant of calcination thereof at 750° C.

Figure 47:
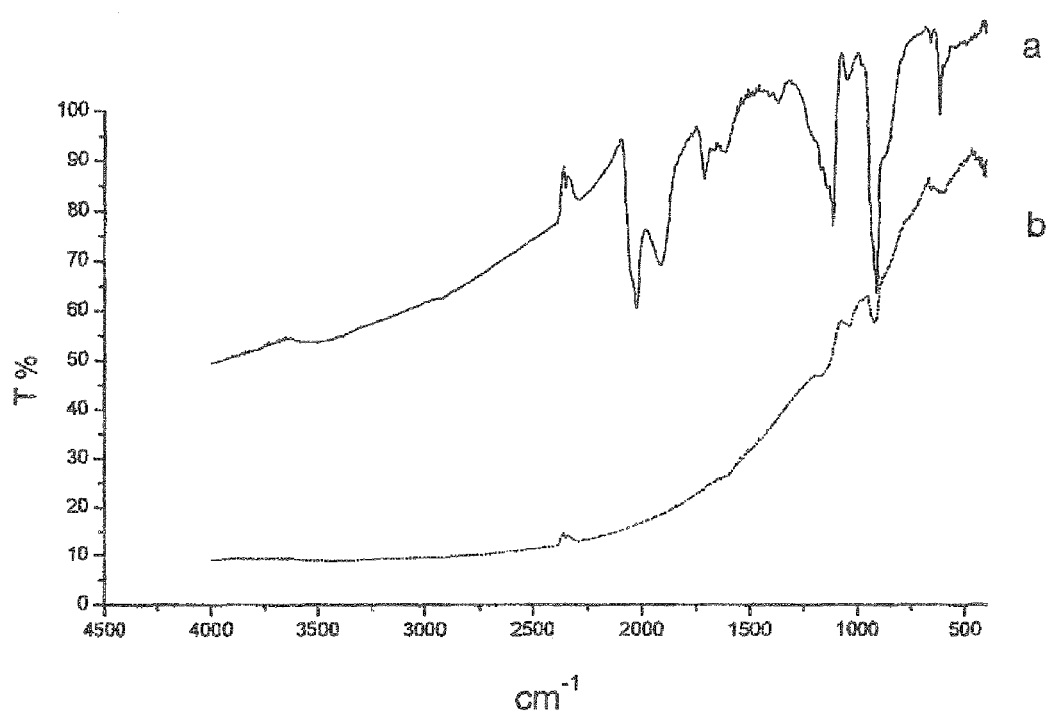
FIG. 47 shows the 46B spectra of a solvothermal product (an S:Rh ratio of 4:1) and a resultant of precalcination thereof at 400° C.

FIG. 47 shows the FTIR spectra of a solvothermal product (with an S:Rh ratio of 4:1) and a resultant of precalcination thereof at 400° C. In the figure, "a" represents a product of hydrothermal synthesis and "b" represents a resultant of precalcination thereof.

Table 1 shows the results of EDX analysis of resultants of precalcination at 750° C.

TABLE 1

| Area No. | S:Re |
|---|---|
| 1 | 2.39 |
| 2 | 1.80 |
| 3 | 1.21 |
| 4 | 2.19 |
| 5 | 1.71 |
| 6 | 1.26 |
| 7 | 2.19 |
| 8 | 2.22 |
| 9 | 1.99 |

As a result of EDX analysis of compositions, an S:Re ratio of 1.98:1 was attained as a mean, and variation in composition was observed regarding the same spherical particle. Thus, an accurate composition ratio may not necessarily be attained.

4.2: Synthesis of $ReS_2$ Via Hydrothermal Reaction

Figure 48:
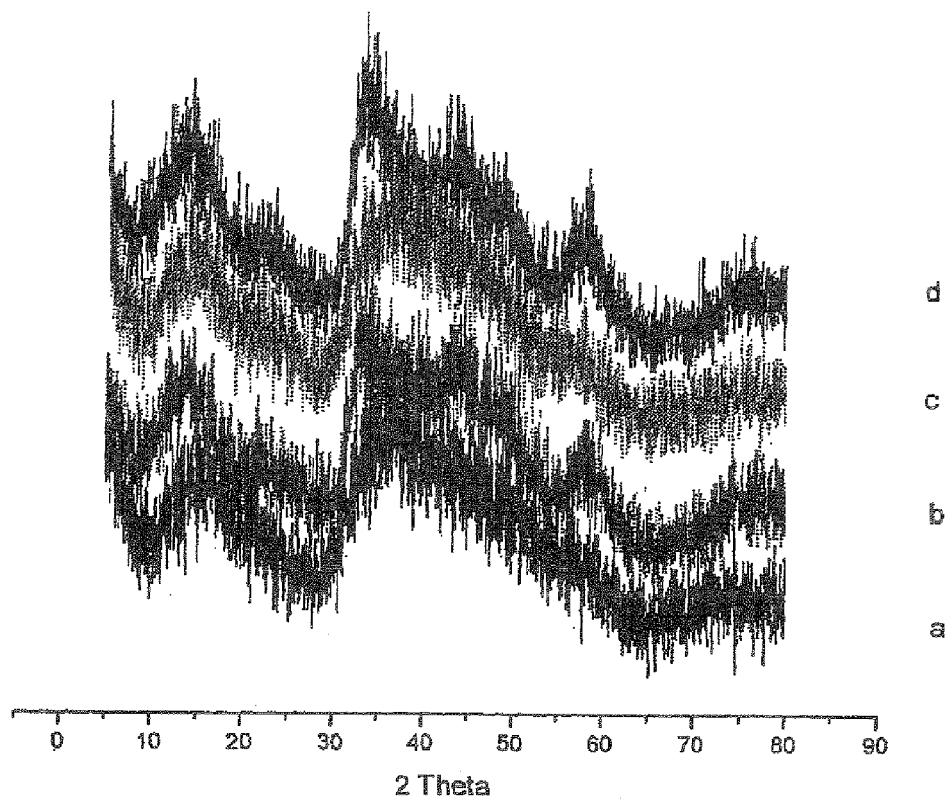
FIG. 48 shows an XRD pattern of $ReS_2$ synthesized via a hydrothermal reaction at 220° C. for 10 hours and that of a resultant of precalcination thereof in an argon stream at 400° C. for 5 hours.
Figure 49:
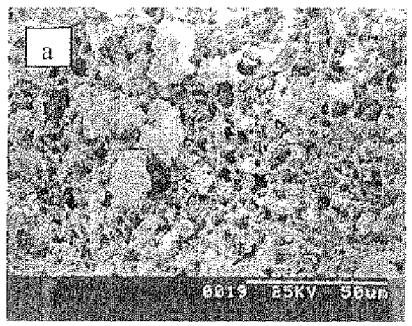
FIGS. 49A, 49B, 49C, and 49D each show a scanning electron micrograph of $ReS_2$ resulting from a hydrothermal reaction and a resultant of precalcination thereof.
Figure 49:
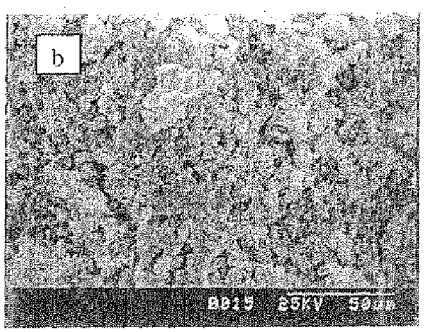
Figure 49:
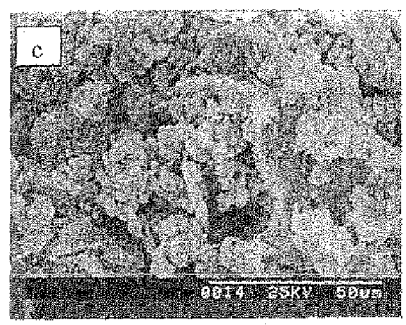
Figure 49:
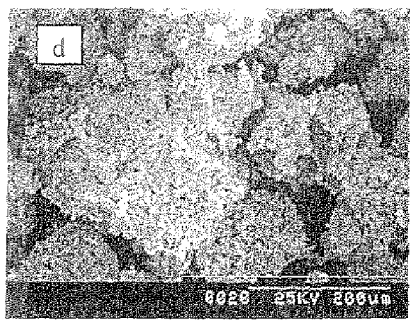

FIG. 48 shows an XRD pattern of $ReS_2$ synthesized via a hydrothermal reaction at 220° C. for 10 hours and that of a resultant of precalcination thereof in an Ar stream at 400° C. for 5 hours. In the Figure, "a" represents a product attained at an S:Re ratio of 2:1, "b" represents a resultant of precalcination thereof, "c" represents a product attained at an S:Re ratio of 4:1, and "d" represents a resultant of precalcination thereof.

Even when the S:Re ratio was changed to 2:1 or 4:1 and the sample was precalcined at 400° C., crystallinity was somewhat improved, but the crystallinity of the product remained low.

FIGS. 49A, 49B, 49C, and 49D each show a scanning electron micrograph of $ReS_2$ resulting from a hydrothermal reaction and a resultant of precalcination thereof. In the figures, "a" represents a product of a hydrothermal reaction at an S:Re ratio of 4:1, "b" represents a resultant of precalcination thereof at 400° C., "c" represents a product of a hydrothermal reaction at an S:Re ratio of 2:1, and "d" represents a resultant of precalcination thereof at 400° C. The product was firmly aggregated.

EXAMPLE 5

Synthesis of Rh—Mo—S $Rh_6(CO)_{16}$ was used as a starting material for Rh, $(NR_4)_6Mo_7O_{24}\cdot4H_2O$ was used as a starting material for Mo, S (solid sulfur) was used as a starting material for S, and xylene was used as a solvent. A solvothermal reaction was carried out at 400° C. for 10 hours. Thereafter, precalcination was carried out in an Ar atmosphere at 400° C. for 5 hours.

As a result of synthesis, the product exhibited an Mo:Rh ratio of 0.2:0.8, an S:Rh ratio of 2.25:1, an S:Mo ratio of 3.0:1, and a filling rate of 50%.

Figure 50:
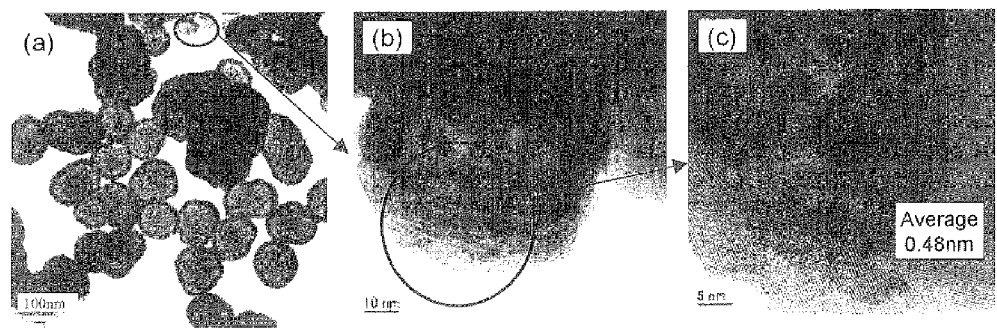
FIG. 50 shows the results of TEM observation of Rh—Mo—S synthesized via a solvothermal reaction at 220° C. for 10 hours.

FIG. 50 shows the results of TEM observation of Rh—Mo—S synthesized via a solvothermal reaction at 220° C. for 10 hours. The results of TEM/EDX analysis demonstrate that Rh—Mo—S is composed of 42.68% of Rh, 4.86% of Mo, and 52.46% of S in terms of an atomic percentage on average. The results also demonstrate that the Mo:Rh ratio is 0.10:0.90, the S/Rh ratio is 1.34:1, and the S:Mo ratio is 12.85:1. Electrochemical properties of $Rh_2S_3$/C and Rh—Mo—S/C As electrochemical properties of $Rh_2S_3$/C obtained in Example 3 and those of Rh—Mo—S/C obtained in Example 5, the oxygen reduction currents in relation to electric potentials were inspected.

Figure 51:
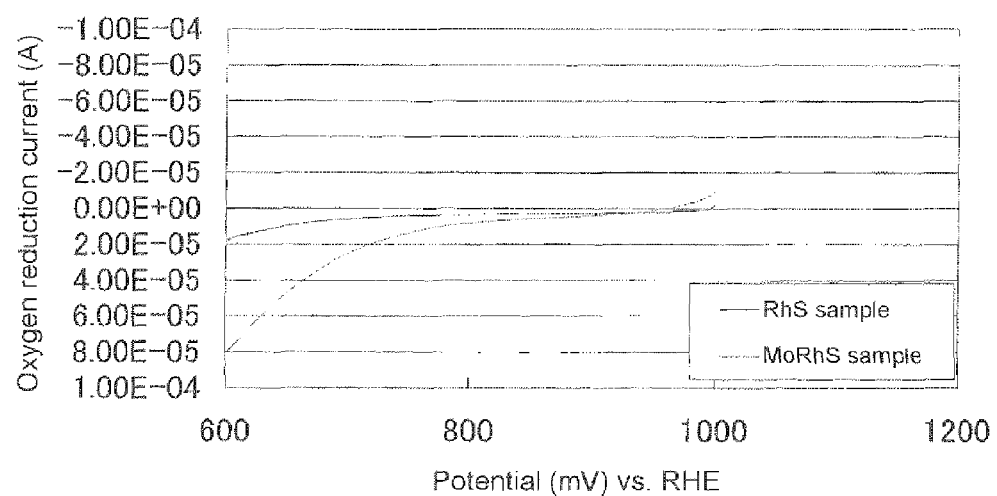
FIG. 51 shows the oxygen reduction currents of $Rh_2S_3$/C and Rh—Mo—S/C.

FIG. 51 shows the oxygen reduction currents of $Rh_2S_3$/C and Rh—Mo—S/C. In FIG. 50, enlarged views of the area around the potential at which oxygen reduction is initiated were additionally provided.

The results shown in FIG. 51 demonstrate oxygen-reducing functions of $Rh_2S_3$/C and Rh—Mo—S/C. While the activity of $Rh_2S_3$/C is 5.76 E-06 at 0.7 V, the activity of Rh—Mo—S/C is approximately 5 times greater; i.e., 2.52E-05.

Performance Evaluation

Figure 52:
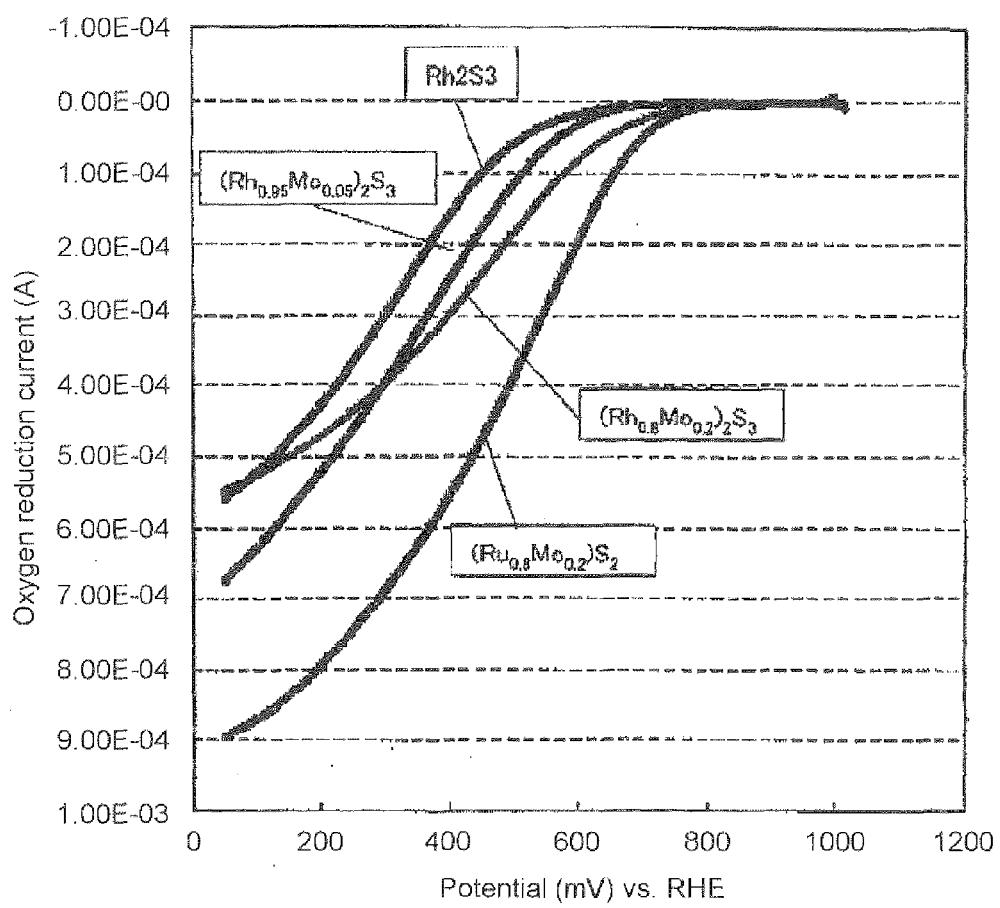
FIG. 52 shows the results of examining the performance as oxygen-reducing catalysts of the fine particle composite comprising fine particles of sulfides or sulfide complexes comprising several elements and conductive fine particles of the present invention.

FIG. 52 shows the results of examining the performance as an oxygen-reducing catalyst of the fine particle composite comprising One particles of sulfides or sulfide complexes comprising several elements and conductive fine particles of the present invention. The results shown in FIG. 52 demonstrate that the fine particle composite comprising fine particles of a sulfide or sulfide composite and conductive particles of the present invention is excellent in oxygen reducing catalytic activity.

Dispersion State of $Rh_2S_3$/C and Rh—Mo—S/C $Rh_2S_3$/C was synthesized in the following manner. At an S:Rh ratio of 1.65:1 and a C:$Rh_2S_3$ ratio of 4:8, a solvothermal reaction was conducted using xylene as a solvent at 400° C. for 10 hours. Thereafter, precalcination was carried out in an Ar atmosphere at 400° C. for 5 hours. Also, Rh—Mo—S/C was synthesized in the following manner. At an Mo:Rh ratio of 5:95, an S:Rh ratio of 1.65:1, and a C:$(Mo+Rh)_2S_3$ ratio of 4:8, a solvothermal reaction was conducted using xylene as a solvent at 400° C. for 10 hours. Thereafter precalcination was carried out in an Ar atmosphere at 400° C. for 5 hours.

Synthesized powder was introduced into alcohol and the resultant was subjected to ultrasonic dispersion for about 5 minutes. The resulting slurry was added dropwise to the Cu microgrid, dried naturally, and then subjected to FE-TEM observation as an observation sample under a field-emission analytical electron microscope ("Tecnai" G2-F20-MAT, Manufactured by FE; accelerating voltage: 200 kV (max.); resolution: 0.24 nm (irradiation on the axis)).

As a result of FE-TEM observation, Rh and S were found to be dispersed at substantially the same positions in $Rh_2S_3$/C. Thus, $Rh_2S_3$/C was determined to be a product of synthesis. C particles are extensively dispersed, so as to surround the sites at which. Rh and S are detected. In Rh—Mo—S/C, Rh, Mo, and S particles are dispersed at substantially the same positions. Thus, Rh—Mo—S/C is determined to be a product of synthesis. Also, C particles are extensively dispersed, so as to surround the sites at which Rh, Mo, and S are detected.

EXAMPLE 6

Synthesis of Ru—Mo—S 6.1: Ratio of Mo:Ru Synthesis $Ru_3(CO)_{16}$ was used as a starting material for Ru, $MoCO_6$ was used as a starting material for Mo, S (solid sulfur) was used as a starting material for S, Ketjen Black EC300J (tradename) was used as carbon black, and xylene was used as a solvent. A solvothermal reaction was carried out at 220° C. for 10 hours. Thereafter, precalcination was carried out in an Ar atmosphere at 600° C. for 5 hours.

As a result of synthesis, a product comprising Mo and Rh at a ratio of 0.2:0.8 (this product is referred to as "MoRuS/C-1") and a product comprising Mo and Rh at a ratio of 0.05:0.95 (this product is referred to as "MoRuS/C-2") were obtained.

Figure 53:
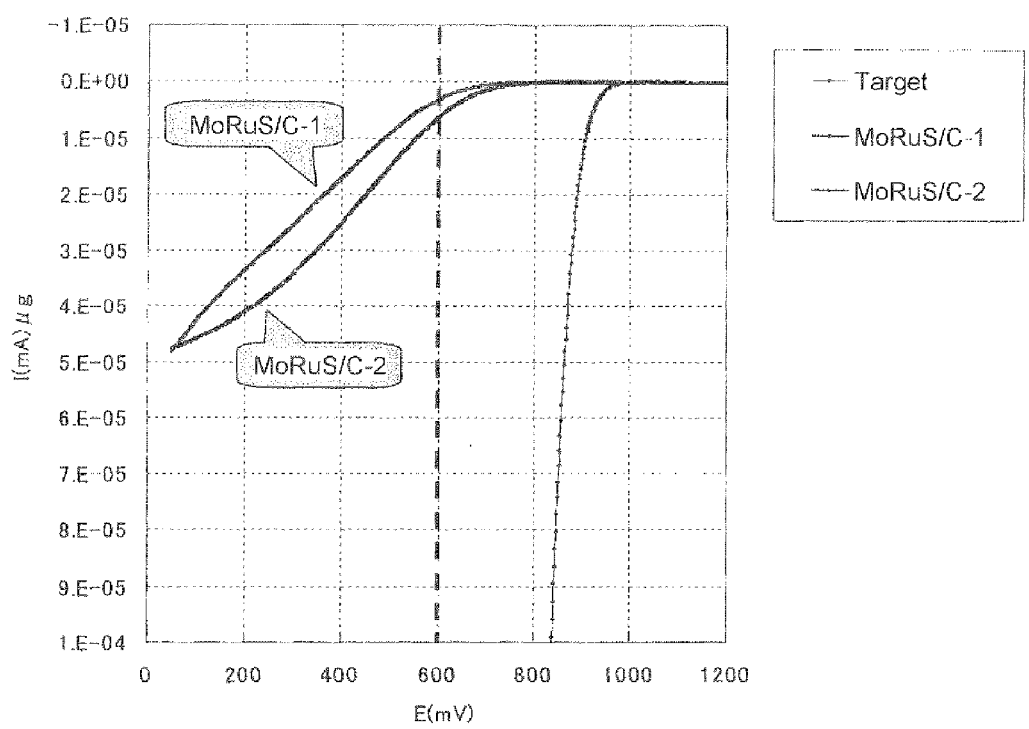
FIG. 53 shows the results of RDE evaluation of MoRuS/C-1 and MoRuS/C-2, which are Ru—Mo—S products synthesized via a solvothermal reaction.

FIG. 53 shows the results of RDE evaluation of MoRuS/C-1 and MoRuS/C-2, which are Ru—Mo—S products synthesized via a solvothermal reaction.

Figure 54:
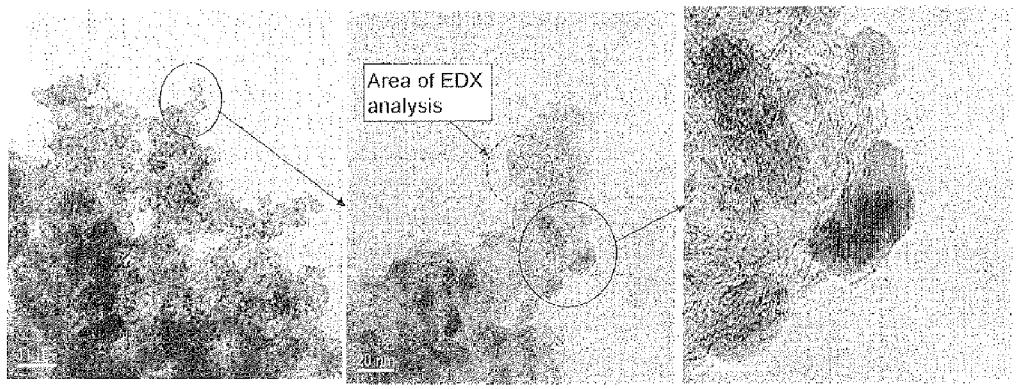
FIG. 54 shows the results of TEM observation of MoRuS/C-1 synthesized via a solvothermal reaction.

FIG. 54 shows the results of TEM observation of MoRuS/C-1 via a solvothermal reaction. The results shown in FIG. 54 demonstrate that MoRuS and C are dispersed on a nanoscale level.

6.2: S Content $Ru_3(CO)_{16}$ was used as a starting material for Ru, $MoCO_6$ was used as a starting material for Mo, S (solid sulfur) was used as a starting material for S. Ketjen Black EC3001 (tradename) was used as carbon black, and xylene was used as a solvent. A solvothermal reaction was carried out at an Mo:Rh ratio of 0.2:0.8 at 220° C. for 10 hours. Thereafter, precalcination was carried out in an Ar atmosphere at 600° C. for 5 hours.

As a result of synthesis, a product with an S content of 300% (this product is referred to as "MoRuS/C-1"), a product with an S content of 100% (this product is referred to as "MoRuS/C-4"), and a product with an S content of 70% (this product is referred to as "MoRuS/C-5") were obtained.

Figure 55:
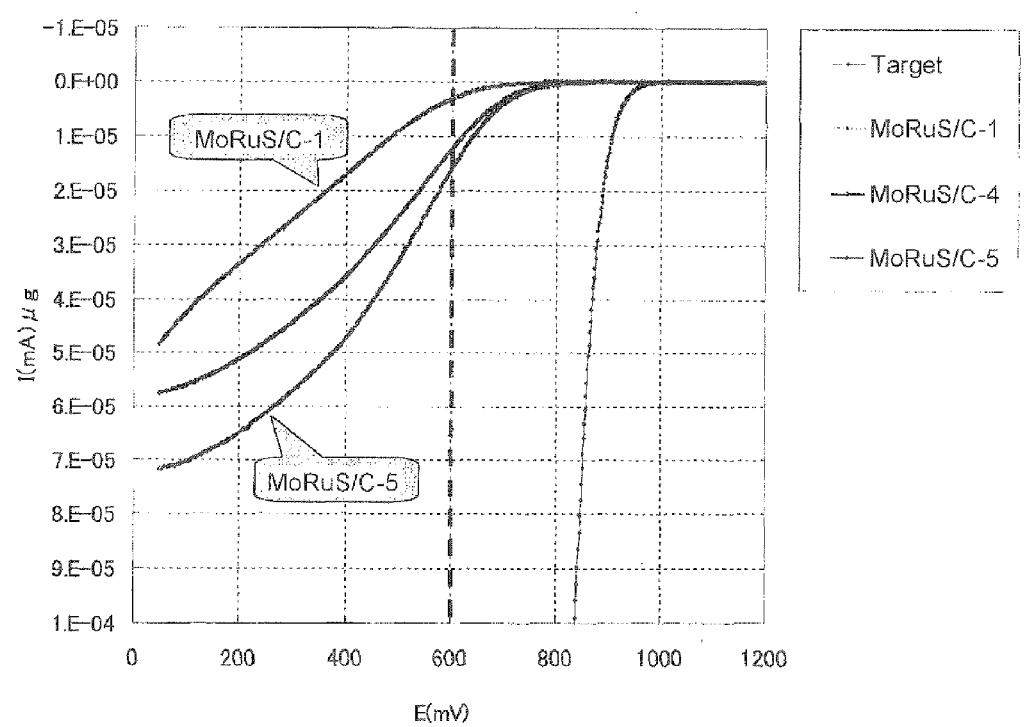
FIG. 55 shows the results of RDE evaluation of MoRuS/C-1, MoRuS/C-4, and MoRuS/C-5, which are Ru—Mo—S products synthesized via a solvothermal reaction.

FIG. 55 shows the results of RDE evaluation of MoRuS/C—1, MoRuS/C-4, and MoRuS/C-5, which are Ru—Mo—S products synthesized via a solvothermal reaction.

6.3: Carbon Black (CB) and Carbon Nanotube (CNT) Paper $Ru_3(CO)_{16}$ was used as a starting material for Ru, $MoCO_6$ was used as a starting material for Mo, S (solid sulfur) was used as a starting material for S, carbon black (Ketjen Black EC300J, tradename) or carbon nanotube (CNT) paper was used, and xylene was used as a solvent. A solvothermal reaction was carried out at an Mo:Rh ratio of 0.2:0.8 at 220° C. for 10 hours. Thereafter, precalcination was carried out in an Ar atmosphere at 600° C. for 5 hours.

As a result of synthesis, carbon black (referred to as "MoRuS/C-5") and carbon nanotube (CNT) paper (referred to as "Paper") were obtained.

Figure 56:
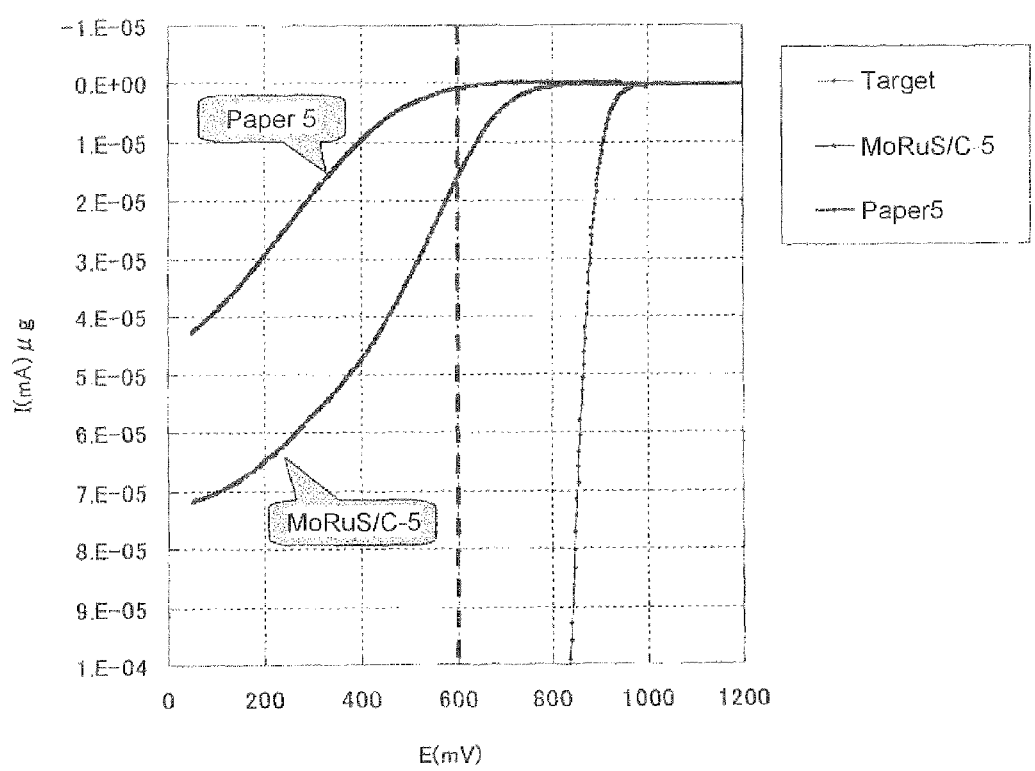
FIG. 56 shows the results of RDE evaluation of MoRuS/C-5 and Paper, which are Ru—Mo—S products synthesized via a solvothermal reaction.

FIG. 56 shows the results of RDE evaluation of MoRuS/C-5 and Paper, which are Ru—Mo—S products synthesized via a solvothermal reaction.

6.4: Calcination Temperature $Ru_3(CO)_{16}$ was used as a starting material for Ru, $MoCO_6$ was used as a starting material for Mo, S (solid sulfur) was used as a starting material for S, Ketjen Black EC300J (tradename) was used as carbon black, and xylene was used as a solvent. A solvothermal reaction was carried out at an Mo:Rh ratio of 0.21:0.79 at 220° C. for 10 hours. Thereafter, precalcination was carried out in an Ar atmosphere at 350° C. for 5 hours or at 450° C. for 5 hours.

As a result, a product attained at 350° C. for 5 hours (this product is referred to as "MoRuS/C-11-C2") and a product attained at 450° C. for 5 hours (this product is referred to as "MoRuS/C-11-C4") were obtained.

Figure 57:
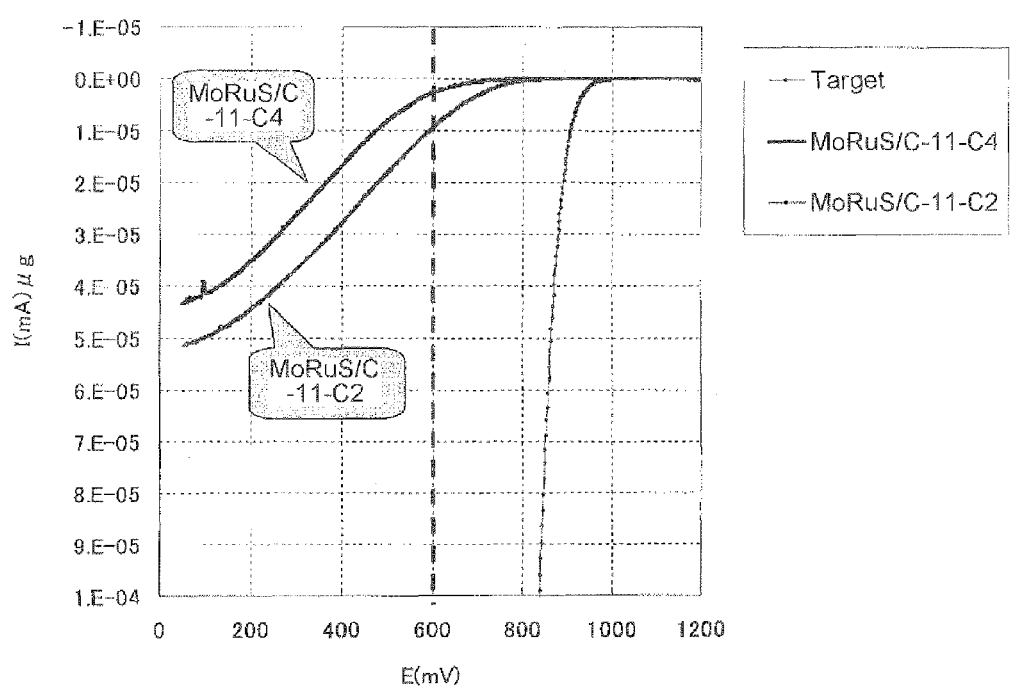
FIG. 57 shows the results of RDE evaluation of MoRuS/C—H—C2 and MoRuS/C-11-C4, which are Ru—Mo—S products synthesized via a solvothermal reaction.

FIG. 57 shows the results of RDE evaluation of MoRuS/C-11-C2 and MoRuS/C-11-C4 which are Ru—Mo—S products synthesized via a solvothermal reaction.

6.5: Calcination Time $Ru_3(CO)_{16}$ was used as a starting material for Ru, $MoCO_6$ was used as a starting material for Mo, S (solid sulfur) was used as a starting material for S, Ketjen Black EC300J (tradename) was used as carbon black, and xylene was used as a solvent. A solvothermal reaction was carried out at an Mo:Rh ratio of 0.21:0.79 at 140° C. for 20 hours. Thereafter, precalcination was carried out in an Ar atmosphere at 350° C. for 2 hours or at 350° C. for 5 hours.

As a result of synthesis, a product attained at 350° C. for 2 hours (this product is referred to as "MoRuS/C-12") and a product attained at 350° C. for 5 hours (this product is referred to as "MoRuS/C-14") were obtained.

Figure 58:
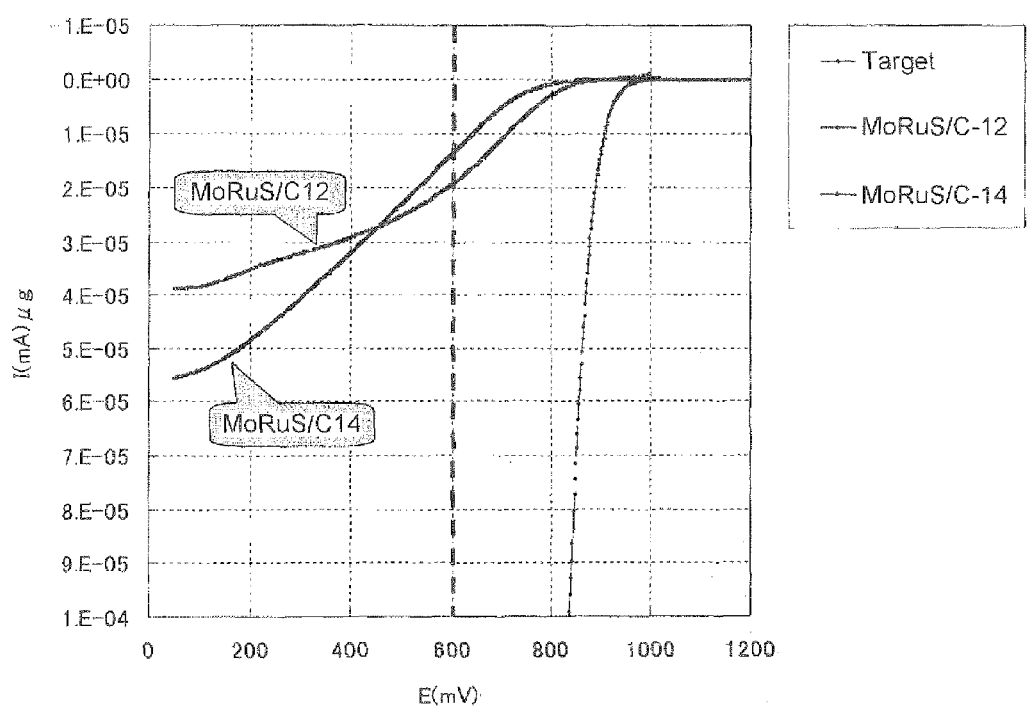
FIG. 58 shows the results of RDE evaluation of MoRuS/C-12 and MoRuS/C-14, which are Ru—Mo—S products synthesized via a solvothermal reaction.

FIG. 58 shows the results of RDE evaluation of MoRuS/C-12 and MoRuS/C-14, which are Ru—Mo—S products synthesized via a solvothermal reaction.

6.6: Changing of Synthesis Conditions Using Carbon Nanotube (CNT) Dispersion $Ru_3(CO)_{16}$ was used as a starting material for Ru, $MoCO_6$ was used as a starting material for Mo, S (solid sulfur) was used as a starting material for S, a dispersion of 0.05 g of carbon nanotubes (CNT) in water was used, and water was used as a solvent. A hydrothermal reaction was carried out at an Mo:Rh ratio of 0.17:0.83 at 140° C. for 10 hours or at 220° C. for 10 hours. Thereafter, precalcination was carried out in an Ar atmosphere at 350° C. for 2 hours.

As a result of synthesis, a product attained at 140° C. for 10 hours (this product is referred to as "MoRu—H1-CNT-C1") and a product attained at 220° C. for 10 hours (this product is referred to as "MoRu—H2-CNT-C1") were obtained.

Figure 59:
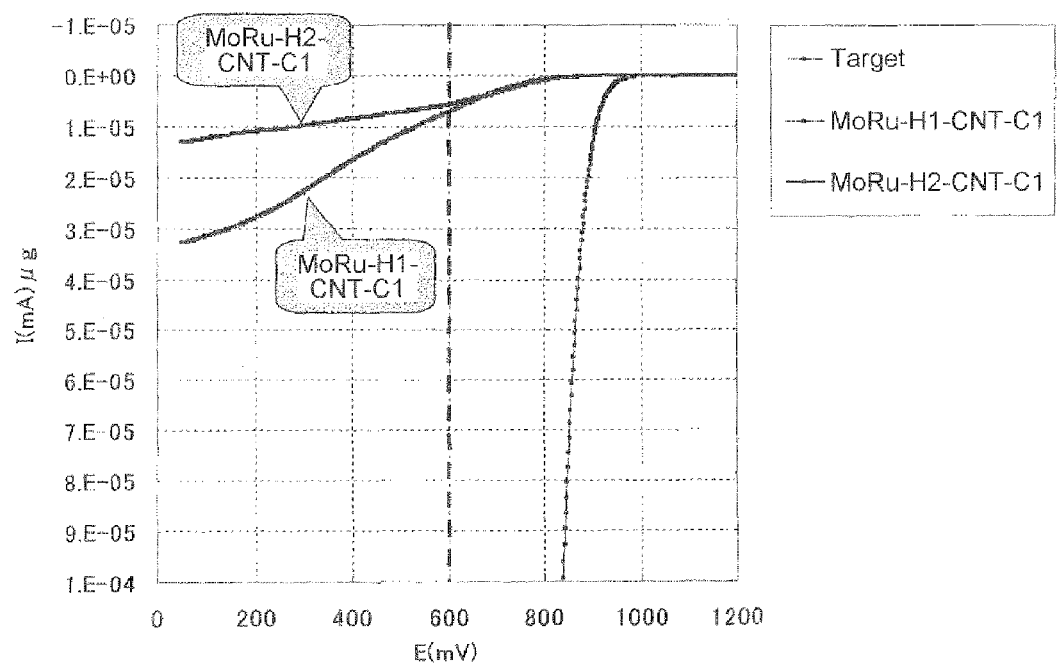
FIG. 59 shows the results of RDE evaluation of MoRu—H1-CNT-C1 and MoRu—H2-CNT-C1, which are Ru—Mo—S products synthesized via a solvothermal reaction.

FIG. 59 shows the results of RDE evaluation of MoRu—H1-CNT-C1 and MoRu—H2-CNT-C1, which are Ru—Mo—S products synthesized via a hydrothermal reaction.

Figure 60:
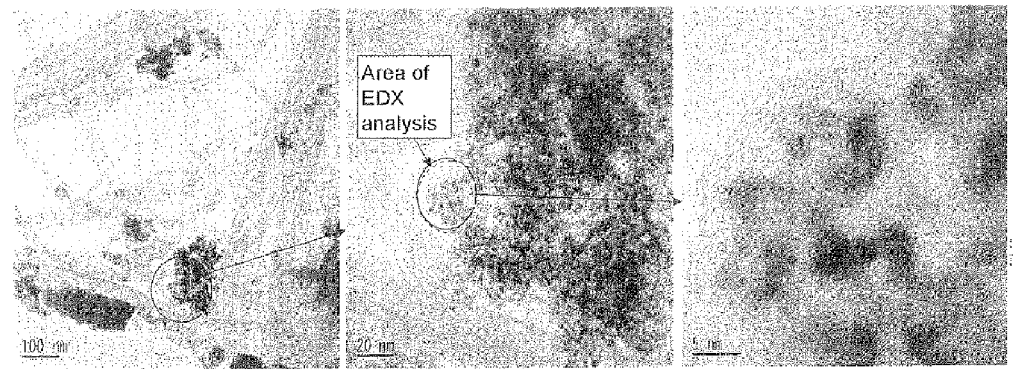
FIG. 60 shows the results of TEM observation of MoRu—H1-CNT-C1, which is an Ru—Mo—S product synthesized via a hydrothermal reaction.

FIG. 60 shows the results of TEM observation of MoRu—H1-CNT-C1, which is an Ru—Mo—S product synthesized via a hydrothermal reaction. The results shown in FIG. 60 demonstrate that MoRuS are dispersed on carbon nanotubes on a nanoscale level.

6.7: Changing of Synthesis Conditions Using Carbon Black (CB)

$Ru_3(CO)_{16}$ was used as a starting material for Ru, $MoCO_6$ was used as a starting material for Mo, S (solid sulfur) was used as a starting material for S, Ketjen Black EC300J (tradename) was used as carbon black, and xylene was used as a solvent. A solvothermal reaction was carried out at an Mo:Rh ratio of 0.17:0.83 at 140° C. for 10 hours or at 220° C. for 10 hours. Thereafter, precalcination was carried out in an Ar atmosphere at 350° C. for 2 hours.

As a result of synthesis, a product attained at 140° C. for 10 hours (this product is referred to as "MoRu—H1-CB—C1") and a product attained at 220° C. for 10 hours (this product is referred to as "MoRu—H2-CB—C1") were obtained.

Figure 61:
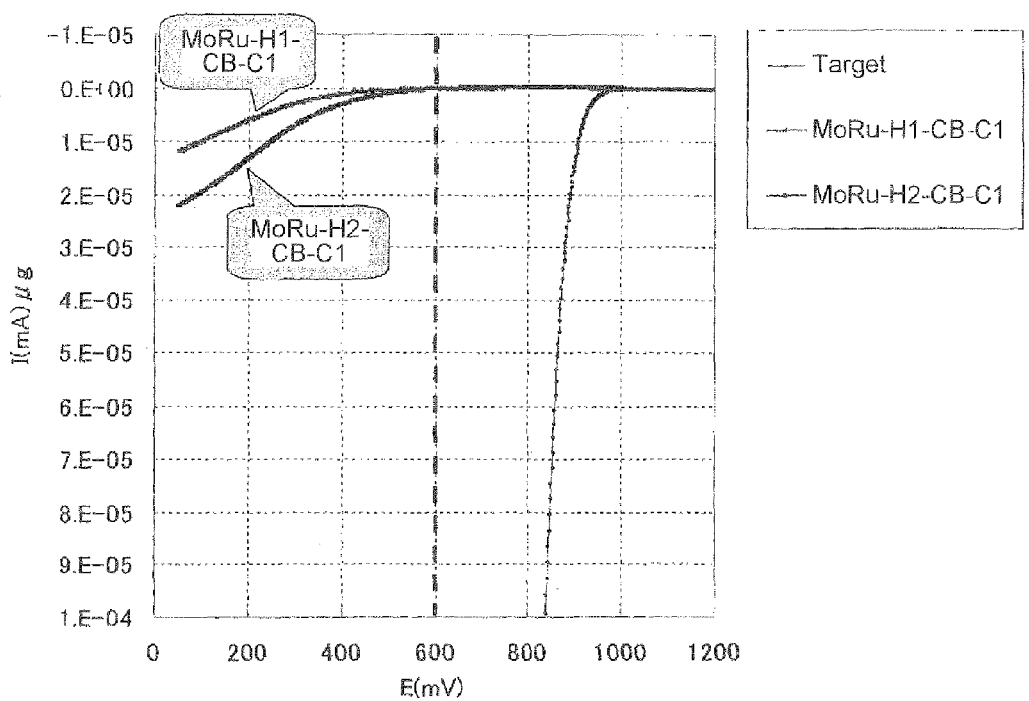
FIG. 61 shows the results of RDE evaluation of MoRu—H1-CB—C1 and MoRu—H2-CB—C1, which are Ru—Mo—S products synthesized via a solvothermal reaction.

FIG. 61 shows the results of RDE evaluation of MoRu—H1-CB—C1 and MoRu—H2-CB—C1 which are Ru—Mo—S products synthesized via a solvothermal reaction.

6.8: Changing of S Content and Calcination Temperature Using a Dispersion of Carbon Nanotubes (CNT) in Water $Ru_3(CO)_{16}$ was used as a starting material for Ru, $MoCO_6$ was used as a starting material for Mo, S (solid sulfur) was used as a starting material for S, a dispersion of 0.2 g of carbon nanotubes (CNT) in water was used, and water was used as a solvent. A hydrothermal reaction was carried out at an Mo:Rh ratio of 0.2:0.9 at 220° C. for 10 hours. Thereafter, precalcination was carried out in an Ar atmosphere at 350° C. for 2 hours or at 550° C. for 2 hours.

As a result of synthesis, a product attained at 350° C. for 2 hours with an S content of 70% (this product is referred to as "MoRu—H01-CNT-C1"), a product attained at 550° C. for 2 hours with an S content of 70% (this product is referred to as "MoRu—H01-CNT-C2"), a product attained at 350° C. for 2 hours with an S content of 50% (this product is referred to as "MoRu—H02-CNT-C1"), and a product attained at 550° C. for 2 hours with an S content of 50% (this product is referred to as "MoRu—H02-CNT-C2") were obtained.

Figure 62:
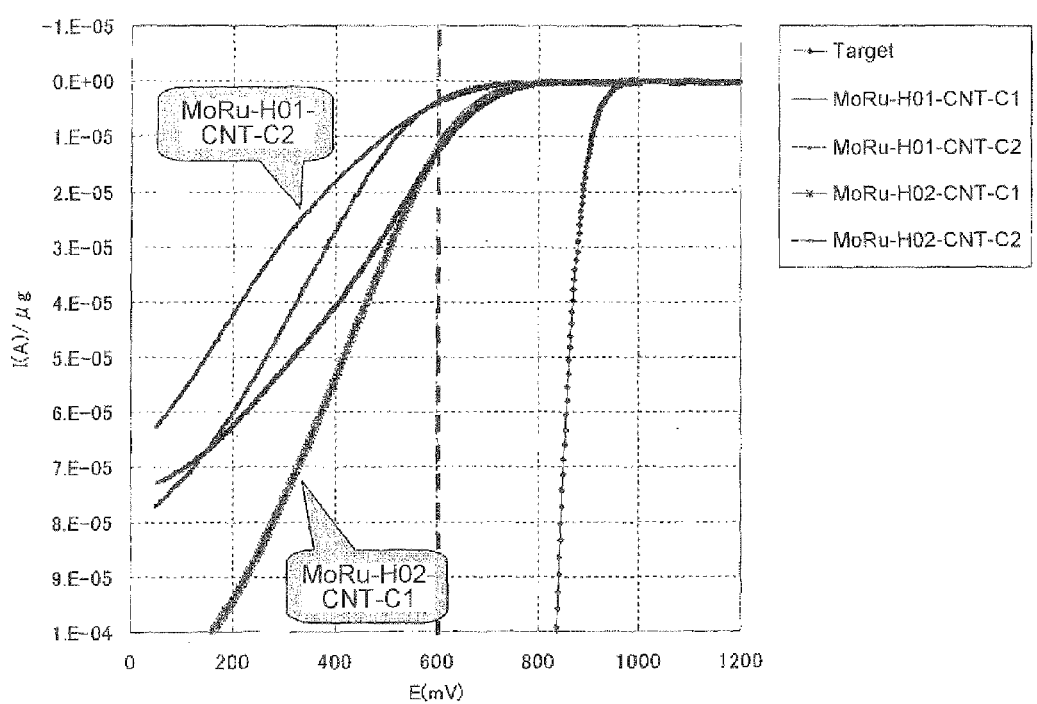
FIG. 62 shows the results of RDE evaluation of MoRu—H01-CNT-C1, MoRu—H01-CNT-C2, MoRu—H02-CNT-C1, and MoRu—H02-CNT-C2, which are Ru—Mo—S products synthesized via a hydrothermal reaction.

FIG. 62 shows the results of RDE evaluation of MoRu—H01-CNT-C1, MoRu—H01-CNT-C2, MoRu—H02-CNT-C1, and MoRu—H02-CNT-C2, which are Ru—Mo—S products synthesized via a hydrothermal reaction.

6.9: Changing of S Content and Calcination Temperature Using a Dispersion of Carbon Nanotubes (CNT) in Xylene $Ru_3(CO)_{16}$ was used as a starting material for Ru, $MoCO_6$ was used as a starting material for Mo, S (solid sulfur) was used as a starting material for S, a dispersion of 0.2 of carbon nanotubes (CNT) in xylene was used, and xylene was used as a solvent. A solvothermal reaction was carried out at an Mo:Rh ratio of 0.2:0.9 at 220° C. for 10 hours. Thereafter, precalcination was carried out in an Ar atmosphere at 350° C. for 2 hours or at 550° C. for 2 hours.

As a result of synthesis, a product attained at 350° C. for 2 hours with an S content of 70% (this product is referred to as "MoRu—S01-CNT-C1"), a product attained at 550° C. for 2 hours with an S content of 70% (this product is referred to as "MoRu—S01-CNT-C2"), a product attained at 350° C. for 2 hours with an S content of 50% (this product is referred to as "MoRu—S02-CNT-C1"), and a product attained at 550° C. for 2 hours with an S content of 50% (this product is referred to as "MoRu—S02-CNT-C2") were obtained.

Figure 63:
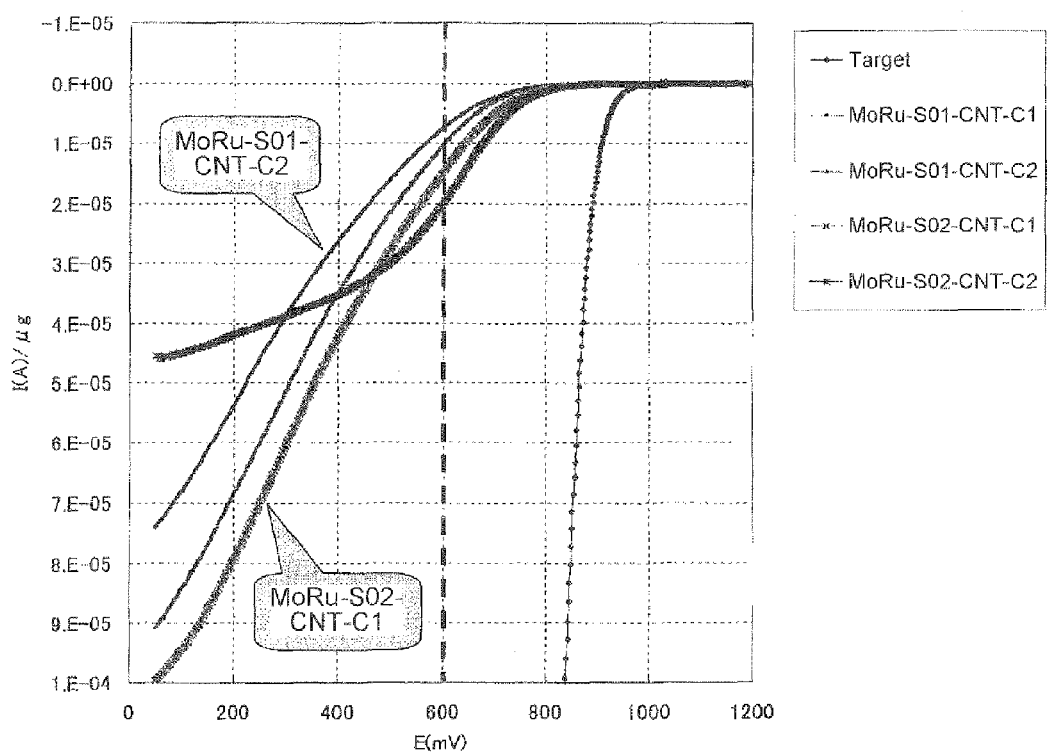
FIG. 63 shows the results of RDE evaluation of MoRu—S01-CNT-C2, MoRu—S01-CNT-C2, MoRu—S02-CNT-C1, and MoRu—S02-CNT-C2, which are Ru—Mo—S products synthesized via a solvothermal reaction.

FIG. 63 shows the results of RDE evaluation of MoRu—S01-CNT-C1, MoRu—S01-CNT-C2, MoRu—S02-CNT-C1, and MoRu—S02-CNT-C2, which are Ru—Mo—S products synthesized via a solvothermal reaction.

INDUSTRIAL APPLICABILITY

The present invention can provide a fine particle composite comprising fine particles of a sulfide or sulfide complex comprising at least one element selected from the group consisting of molybdenum (Mo), rhodium (Rh), ruthenium (Ru), and rhenium (Re) and conductive fine particles. Such fine particle composite comprising fine particles of a sulfide or sulfide complex comprising a given element and conductive fine particles can be used for known applications. Further, development thereof can be expected in various applications by making use of its properties. For example, such substance can be used for a catalyst for a fuel cell that can be operated in a cost-effective manner. Furthermore adequate selection of a dopant element with which the particle is to be doped can lead to manifestation of various physical properties.

The invention claimed is:

1. A method for producing a fine particle composite comprising fine particles of a sulfide or sulfide complex comprising at least one element selected from the group consisting of molybdenum (Mo), rhodium (Rh), ruthenium (Ru), and rhenium (Re) and conductive fine particles, the method comprising steps of:
preparing a solvent mixture from
- a first compound containing conductive carbon powder selected from the group consisting of carbon black and carbon nanotube,
- a second compound containing at least one element selected from the group consisting of molybdenum (Mo), rhodium (Rh), ruthenium (Ru), and rhenium (Re), and
- sulfur (S); and conducting a hydrothermal or solvothermal reaction at a pressure and temperature that convert the solvent mixture into a supercritical state in water or solvent or into a subcritical state in water or solvent, wherein the hydrothermal or solvothermal reaction is carried out at 200° C. to 600° C., and the hydrothermal or solvothermal reaction is followed by thermal treatment in an inert gas atmosphere at 300° C. to 800° C., wherein the fine particle composite comprising fine particles of a sulfide or sulfide complex comprising at least one element selected from the group consisting of molybdenum (Mo), rhodium (Rh), ruthenium (Ru), and rhenium (Re); and conductive fine particles is obtained.

2. The method for producing a fine particle composite according to claim 1, wherein the reaction is carried out in situ.

3. A method for producing a fine particle composite comprising fine particles of a sulfide complex comprising molybdenum (Mo), and rhodium (Rh) or ruthenium (Ru); and conductive fine particles, the method comprising steps of:
preparing a solvent mixture from
- a first compound containing conductive carbon powder selected from the group consisting of carbon black and carbon nanotube,
- a second compound containing molybdenum (Mo),
- a third compound containing rhodium (Rh) or ruthenium (Ru), and
- sulfur (S) or a sulfur (S)-containing compound; and conducting a hydrothermal or solvothermal reaction at a pressure and temperature that convert the solvent mixture into a supercritical state in water or solvent or into a subcritical state in water or solvent, wherein the hydrothermal or solvothermal reaction is carried out at 200° C. to 600° C., and the hydrothermal or solvothermal reaction is followed by thermal treatment in an inert gas atmosphere at 300° C. to 800° C.

4. The method for producing a fine particle composite according to claim 3, wherein the fine particle composite comprising fine particles of a sulfide complex comprising molybdenum (Mo), and rhodium (Rh) or ruthenium (Ru); and conductive fine particles is obtained.

5. The method for producing a fine particle composite according to claim 3, wherein the sulfide complex comprising molybdenum (Mo), and rhodium (Rh) or ruthenium (Ru) is a sulfide complex represented by Rh—Mo—S or Ru—Mo—S.

6. The method for producing a fine particle composite according to claim 4, wherein the sulfide complex comprising molybdenum (Mo), and rhodium (Rh) or ruthenium (Ru) is a sulfide complex represented by Rh—Mo—S or Ru—Mo—S.

7. A method for producing a fine particle composite comprising fine particles of a sulfide or sulfide complex comprising at least one element selected from the group consisting of molybdenum (Mo), rhodium (Rh), ruthenium (Ru), and rhenium (Re) and conductive fine particles, the method comprising steps of:

preparing a solvent mixture from
- a first compound containing conductive carbon powder selected from the group consisting of carbon black and carbon nanotube,
- a second compound containing at least one element selected from the group consisting of molybdenum (Mo), rhodium (Rh), ruthenium (Ru), and rhenium (Re), and
- sulfur (S); and conducting a hydrothermal or solvothermal reaction at a pressure and temperature that convert the solvent mixture into a supercritical state in water or solvent or into a subcritical state in water or solvent, wherein the fine particle composite comprising fine particles of a sulfide or sulfide complex comprising at least one element selected from the group consisting of molybdenum (Mo), rhodium (Rh), ruthenium (Ru), and rhenium (Re); and conductive fine particles is obtained, wherein the hydrothermal or solvothermal reaction is carried out at 200° C. to 600° C., and the hydrothermal or solvothermal reaction is followed by thermal treatment in an inert gas atmosphere at 300° C. to 800° C.

* * * * *